(12) United States Patent
Wu et al.

(10) Patent No.: US 12,512,914 B2
(45) Date of Patent: Dec. 30, 2025

(54) SIDELINK ASSISTED CROSS LINK INTERFERENCE CANCELLATION

(71) Applicant: QUALCOMM Incorporated, San Diego, CA (US)

(72) Inventors: Shuanshuan Wu, San Diego, CA (US); Junyi Li, Fairless Hills, PA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 487 days.

(21) Appl. No.: 17/652,269

(22) Filed: Feb. 23, 2022

(65) Prior Publication Data
US 2023/0269007 A1   Aug. 24, 2023

(51) Int. Cl.
*H04B 15/00* (2006.01)
*H04W 92/18* (2009.01)

(52) U.S. Cl.
CPC ............. *H04B 15/00* (2013.01); *H04W 92/18* (2013.01)

(58) Field of Classification Search
CPC ........ H04B 15/00; H04B 15/02; H04W 92/18
See application file for complete search history.

(56) References Cited

U.S. PATENT DOCUMENTS

| | | | |
|---|---|---|---|
| 9,872,305 B2* | 1/2018 | Moshavi | H04W 72/12 |
| 2016/0249227 A1* | 8/2016 | Liang | H04W 16/14 |
| 2018/0102807 A1 | 4/2018 | Chen et al. | |
| 2018/0139648 A1 | 5/2018 | Park et al. | |
| 2023/0033619 A1* | 2/2023 | Lovlekar | H04W 72/541 |

FOREIGN PATENT DOCUMENTS

| | | | | |
|---|---|---|---|---|
| WO | 2020000082 A1 | 1/2020 | | |
| WO | WO-2019168750 A1 * | 2/2023 | | H04W 4/06 |

OTHER PUBLICATIONS

KR 20110030671, Miyata Takeo, Radio Base Station and Radio Communication method. Mar. 2011, pp. 1-10 (Year: 2011).*
(CN 104244261 A), Zhang et al., The Cross Time-slot Interference Cancellation Method and Terminal, Dec. 2014, pp. 1-14 (Year: 2014).*
International Search Report and Written Opinion—PCT/US2023/011326—ISA/EPO—Aug. 23, 2023.

(Continued)

*Primary Examiner* — Keith Ferguson
(74) *Attorney, Agent, or Firm* — Procopio, Cory, Hargreaves & Savitch LLP

(57) ABSTRACT

Method and apparatus for sidelink assisted interference cancellation. The apparatus receives a set of uplink transmission parameters of a second UE in a neighbor cell. The apparatus performs interference cancellation of an uplink transmission of the second UE on a downlink transmission received from a serving cell. The interference cancellation based at least on the set of uplink transmission parameters of the second UE. The apparatus may provide, to a base station, an indication indicating support for the interference cancellation. The apparatus may indicate, to the base station, a type of interference cancellation operation to be performed by the first UE.

24 Claims, 13 Drawing Sheets

(56) References Cited

OTHER PUBLICATIONS

Mediatek Inc: "UE-Based Interference Mitigation for Rel-17", 3GPP TSG RAN Meeting#84, RP-191098, UE Based IM, 3rd Generation Partnership Project (3GPP), Mobile Competence Centre, 650, Route Des Lucioles, F-06921 Sophia-Antipolis Cedex, France, vol. TSG RAN, No. Newport beach, CA, USA, Jun. 3, 2019-Jun. 6, 2019, Jun. 2, 2019, XP051747312, 5 Pages, p. 1-p. 4, paragraph 4. Proposals.
Partial International Search Report—PCT/US2023/011326—ISA/EPO—May 24, 2023.
ZTE: "Discussion on Measurements and RS Design for CLI Mitigation", 3GPP TSG RAN WG1 Meeting #89, R1-1707204-7.1.6.1 Measurement and RS Design for CLI, 3GPP, Mobile Competence Centre, 650, Route Des Lucioles, F-06921 Sophia-Antipolis Cedex, France, vol. RAN WG1, No. Hangzhou, May 15, 2017-May 19, 2017, May 14, 2017, XP051272419, 9 Pages, para. [0001]—para. [05.1] para. [06.1] para. [0007], p. 2, para. 3, 3.1, 3.2, p. 6, para. 5.2, 6.2, 6.3—p. 8.

\* cited by examiner

SIDELINK ASSISTED CROSS LINK INTERFERENCE CANCELLATION

TECHNICAL FIELD

The present disclosure relates generally to communication systems, and more particularly, to a configuration for sidelink assisted interference cancellation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receives a set of uplink transmission parameters of a second UE in a neighbor cell. The apparatus performs interference cancellation of an uplink transmission of the second UE on a downlink transmission received from a serving cell. The interference cancellation based at least on the set of uplink transmission parameters of the second UE.

In an aspect of the disclosure, a method, a computer-readable medium, and an apparatus are provided. The apparatus may be a device at a base station. The device may be a processor and/or a modem at a base station or the base station itself. The apparatus may be a device at a UE. The device may be a processor and/or a modem at a UE or the UE itself. The apparatus obtains a set of uplink transmission parameters of a second UE in a second cell. The apparatus transmits the set of uplink transmission parameters of the second UE to a first UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
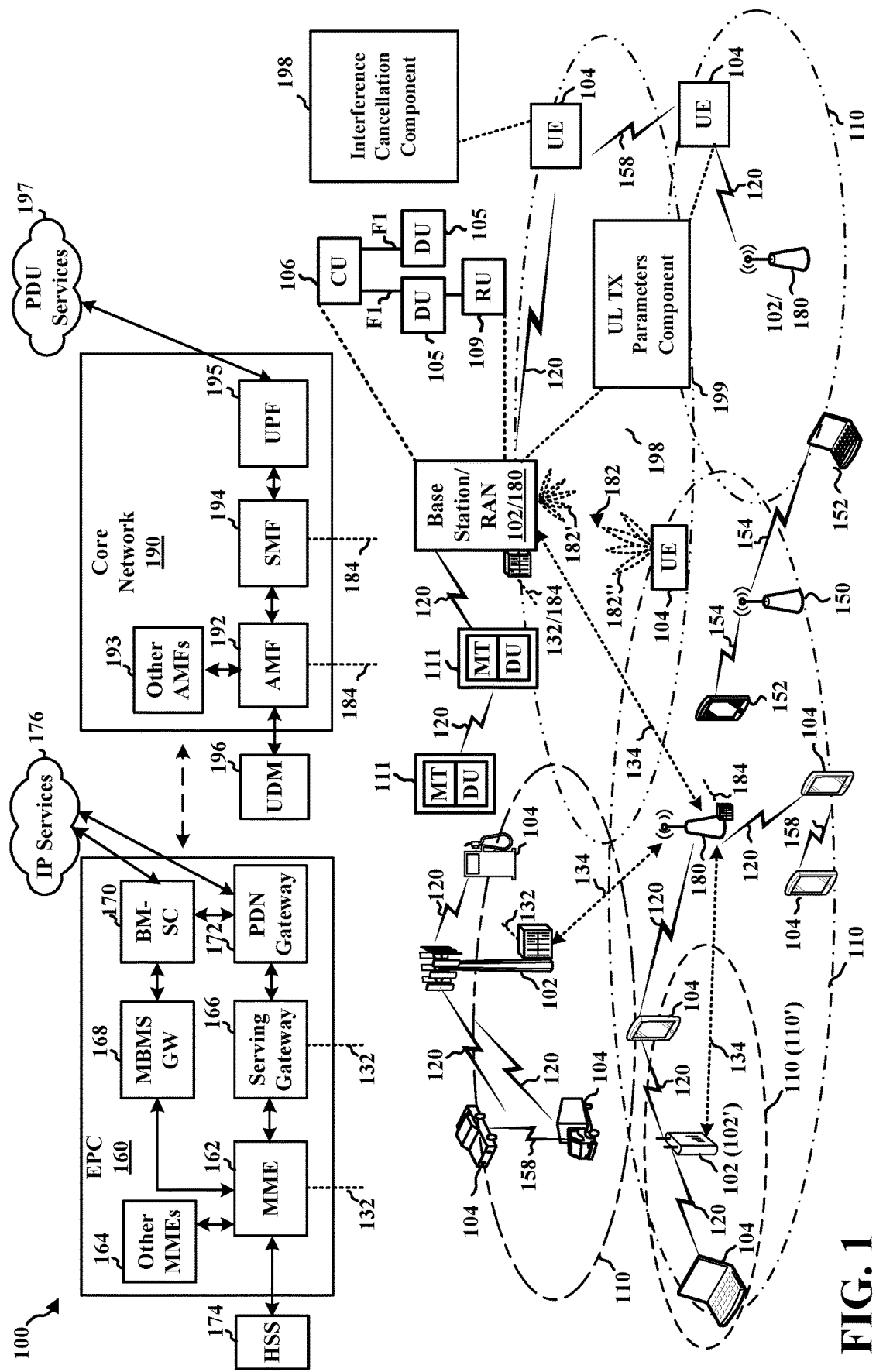
FIG. 1 is a diagram illustrating an example of a wireless communications system and an access network.

In dynamic time domain duplex (TDD) configurations, neighboring cells may have different downlink (DL) and/or uplink (UL) slot configurations. For example, a slot may be used for DL transmission in one cell, while the same slot may be used in a neighboring cell for UL transmission. An issue that may arise in dynamic TDD is cross link interference (CLI). In CLI, an uplink transmission from a first UE in a first cell may interfere with a downlink reception of a second UE in a second cell in instances where the first UE and the second UE are using the same frequency resources. CLI measurements may assist in DL scheduling and avoiding a strong interferer. The CLI measurement may result in improved performance in comparison to not accounting for CLI measurement in the DL scheduling. However, the DL reception performance may still experience interference from UL transmissions, despite the interference being reduced or non-negligible. A proactive solution that may address CLI in dynamic TTD is interference cancellation. In interference cancellation, a interfered UE receiving in DL may be configured to cancel interference from an interfering UE UL transmission in a neighbor cell. However, in order to implement interference cancellation, the interfered UE would need to have knowledge of the transmission configuration and/or parameters of the interfering UE.

Aspects presented herein provide a configuration for CLI cancellation in dynamic TDD systems. The aspects presented herein may allow for interference cancellation of uplink transmissions of an interfering UE in a neighboring cell. The uplink transmission parameters of the interfering UE may be provided to the interfered UE, such that the interference cancellation of the uplink transmissions of the interfering UE in the neighboring cell may be based on one or more of the uplink transmission parameters of the interfering UE. In some aspects, the transmission parameters may be provided by a serving base station. In other aspects, the transmission parameters may be provided to the interfered UE directly from the interfering UE via sidelink. At least one advantage of the disclosure is that the base station associated with the serving cell serving the interfered UE may have more flexibility in scheduling for the interfered UE in dynamic TDD networks. For example, the base station may experience less constraints in scheduling DL transmissions for the interfered UE in instances where the interfering UE in the neighboring cell is transmitting UL transmissions.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and/or another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., Si interface). The base stations 102 configured for 5G NR (collectively referred to as Next Generation RAN (NG-RAN)) may interface with core network 190 through second backhaul links 184. In another deployment example, the base station may also be configured to support 4G LTE or other access technology at the same time. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNB s) (HeNB s), which may provide service to a restricted group known as a closed subscriber group (CSG). In another example, the base stations may also support Non-Public Network (NPN), in the form of either stand-alone Non-Public Network (SNPN) or Public Network Integrated NPN (PNI-NPN). Access to the base stations may be controlled with Closed Access Group (CAG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate in the form of vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), and/or a combination thereof and/or with other devices, which can be collectively referred to as vehicle-to-anything (V2X) communications. Sidelink communication may be based on V2X or other D2D communication, such as Proximity-based Services (ProSe), etc. In addition to UEs, sidelink communication may also be transmitted and received by other transmitting and receiving devices, such as Road Side Unit (RSU) 107, etc. Sidelink communication may be exchanged using a PC5 interface.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 104 provides QoS flow and session management. All user plane PDU session packets, e.g. IP, Ethernet, or unstructured packets, are transferred through the UPF 195. The UPF 195 may provide UE IP address allocation as well as other functions. The UPF 195 is connected to the PDU Services 197. The PDU Services 197 may include the Internet, an intranet, an IP Multimedia Subsystem (IMS), a Packet Switch (PS) Streaming (PSS) Service, and/or other IP or non-IP based services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network. Connections between these devices may be Wi-Fi, Bluetooth, Sidelink, or other D2D communication technologies.

Referring again to FIG. 1, in certain aspects, a network entity (such as a base station 102/180, a component of a base station) or a UE 104 may include an interference cancellation component 198 configured to receive a set of uplink transmission parameters of a second UE in a neighbor cell; and perform interference cancellation of an uplink transmission of the second UE on a downlink transmission received from a serving cell, the interference cancellation based at least on the set of uplink transmission parameters of the second UE. The UE, to receive the set of uplink transmission parameters, may be configured to establish a connection with the second UE, wherein the set of uplink transmission parameters are received in a unicast transmission. The UE may be configured to provide, to a base station, an indication indicating support for the interference cancellation. The UE may be configured to indicate, to the base station, a type of interference cancellation operation to be performed by the first UE. The UE may be configured to transmit, to a base station, a cross-link interference measurement based on the uplink transmission of the second UE.

Referring again to FIG. 1, in certain aspects, a network entity (such as a base station 102/180, a component of a base station) or a UE 104 may include an uplink (UL) transmission (TX) parameters component 199 configured to obtain a set of uplink transmission parameters of a second UE in a second cell; and transmit the set of uplink transmission parameters of the second UE to the first UE. The network entity may be configured to receive the set of uplink transmission parameters from a neighbor base station serving the second UE. The network entity, to transmit the set of uplink transmission parameters, may be configured to establish a connection with the first UE, wherein the set of uplink transmission parameters are transmitted in a unicast transmission. The network entity may be configured to receive an indication that the first UE supports the interference cancellation, wherein a transmission of the set of uplink transmission parameters is provided to the first UE based on the first UE supporting the interference cancellation. The network entity may be configured to receive information indicating a type of interference cancellation operation to be performed by the first UE. The network entity may be configured to schedule a downlink transmission for the first UE without adjustment for cross link interference measurements in response to the indication indicating that the first UE supports the interference cancellation. The network entity may be configured to receive a cross-link interference measurement of the first UE based on the uplink transmission of the second UE. The network entity may be configured to adjust downlink scheduling for the first UE based on the cross-link interference measurement.

Although the following description may be focused on 5G NR, the concepts described herein may be applicable to other similar areas, such as LTE, LTE-A, CDMA, GSM, and other wireless technologies.

Figure 2:
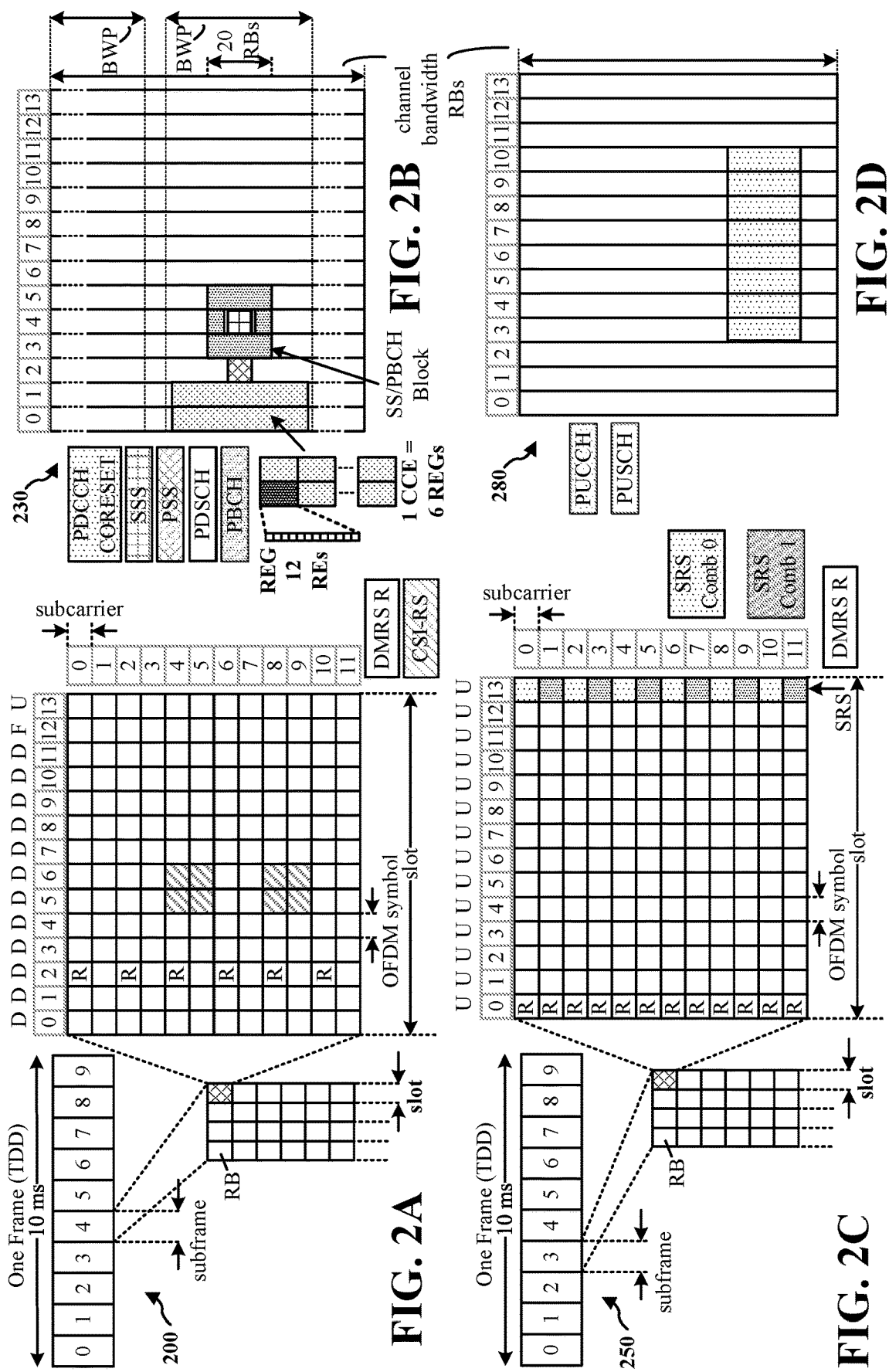
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
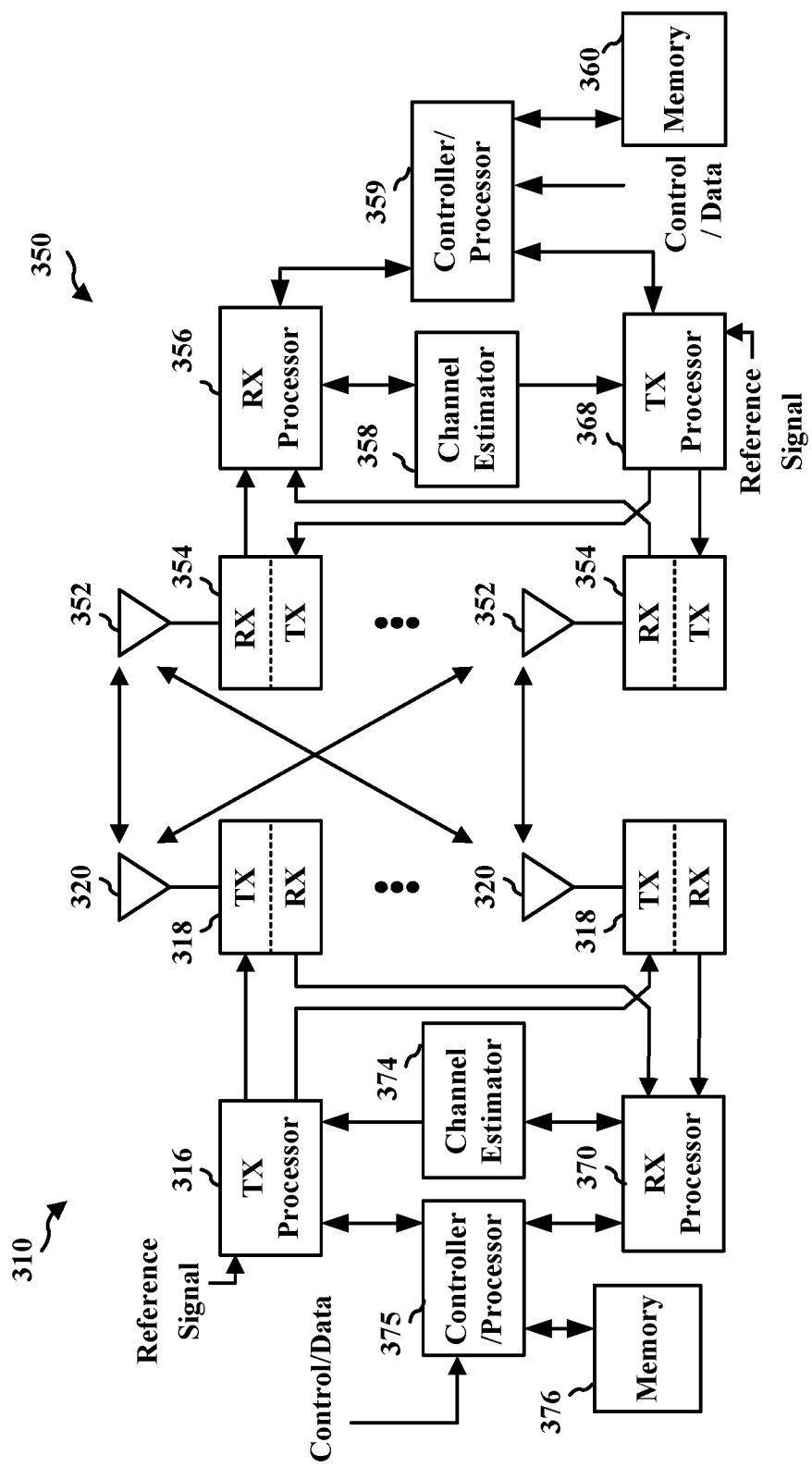
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
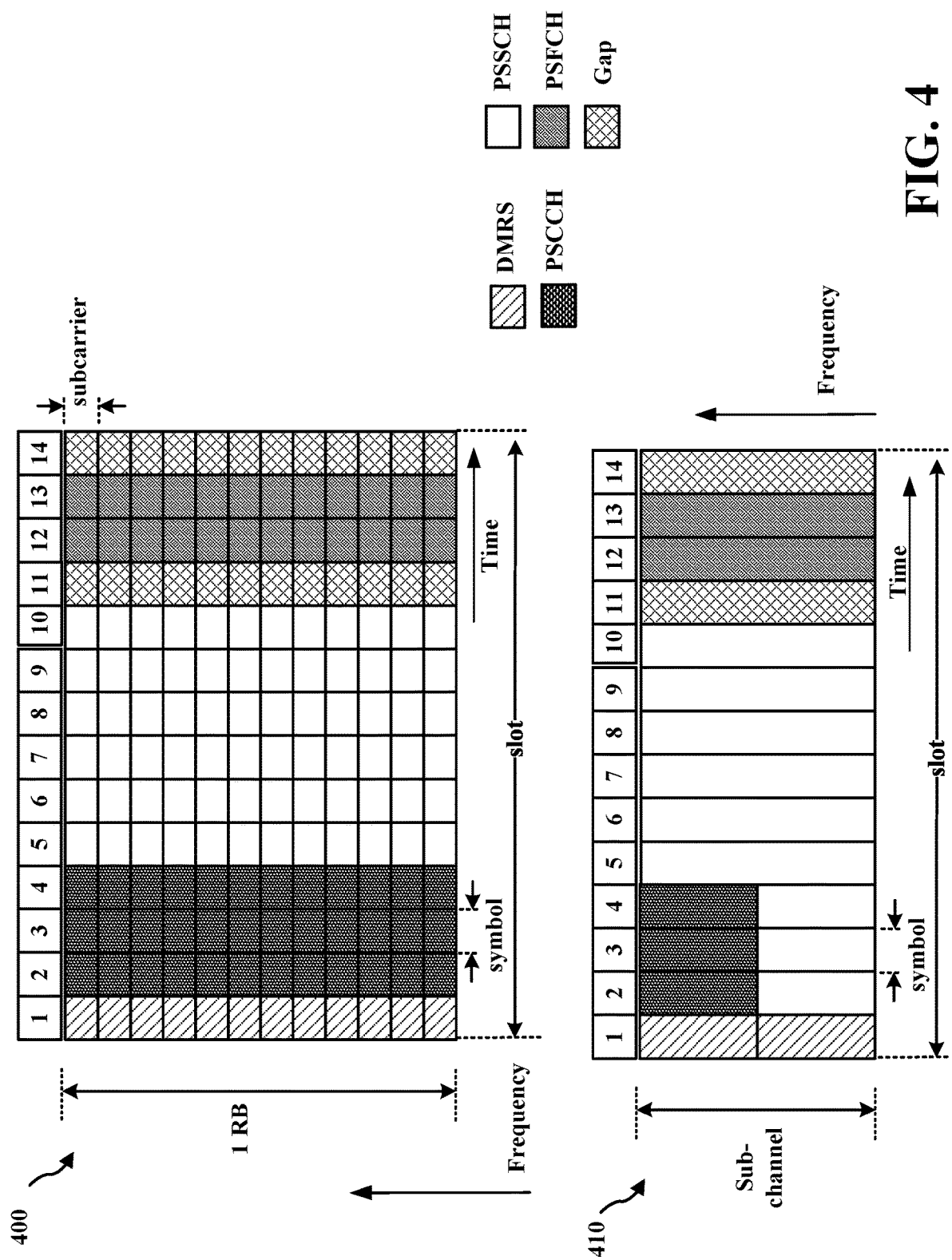
FIG. 4 illustrates example aspects of a sidelink slot structure.

FIG. 4 includes diagrams 400 and 410 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 4 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 400 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 410 in FIG. 4 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 4, some of the REs may include control information in PSCCH and some REs may include demodulation RS (DMRS). At least one symbol may be used for feedback. FIG. 4 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 4. Multiple slots may be aggregated together in some aspects.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 5:
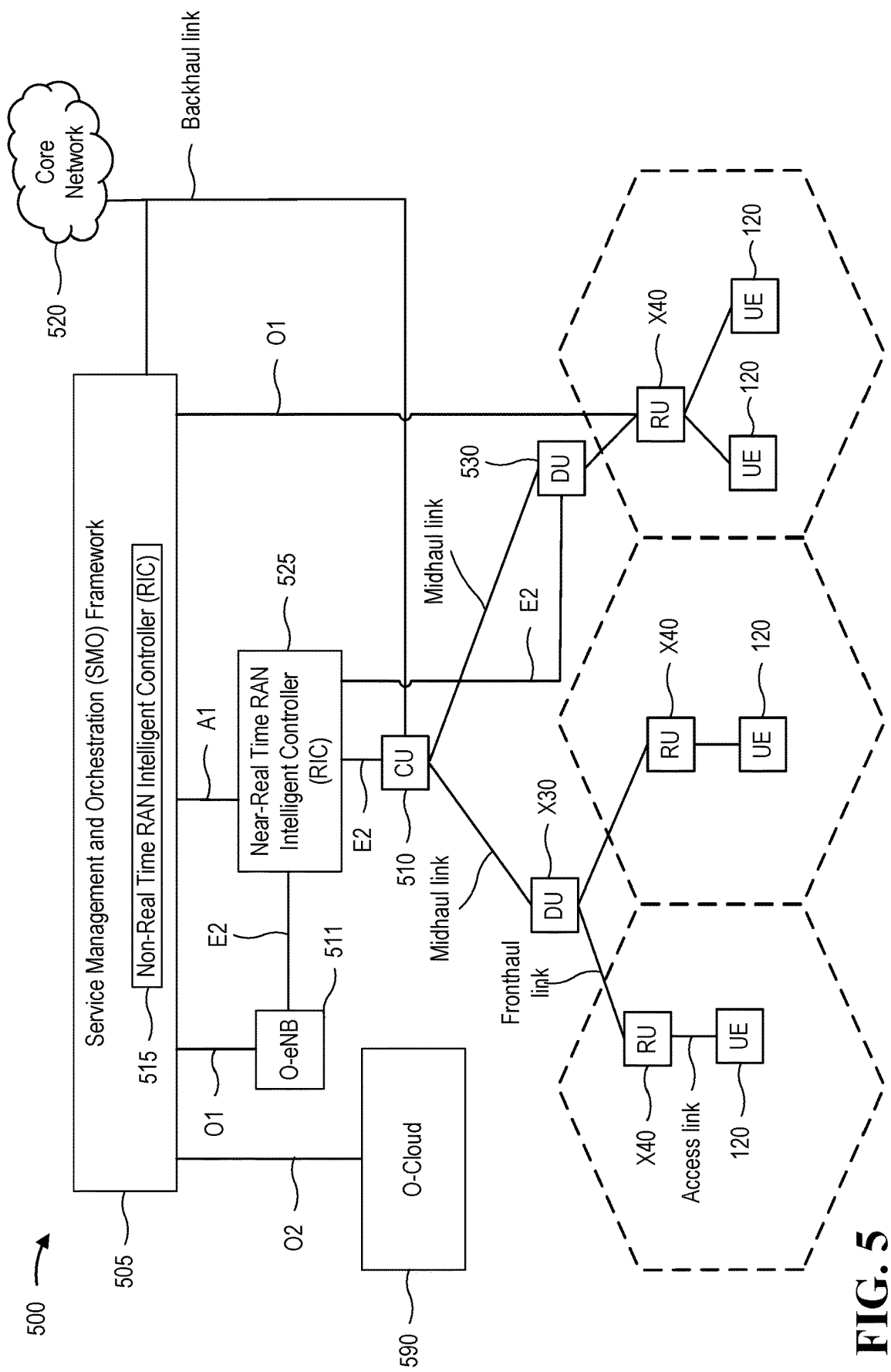
FIG. 5 is a diagram illustrating an example of a disaggregated base station architecture.

FIG. 5 shows a diagram illustrating an example disaggregated base station 500 architecture. The disaggregated base station 500 architecture may include one or more central units (CUs) 510 that can communicate directly with a core network 520 via a backhaul link, or indirectly with the core network 520 through one or more disaggregated base station units (such as a Near-Real Time (Near-RT) RAN Intelligent Controller (RIC) 525 via an E2 link, or a Non-Real Time (Non-RT) RIC 515 associated with a Service Management and Orchestration (SMO) Framework 505, or both). A CU 510 may communicate with one or more distributed units (DUs) 530 via respective midhaul links, such as an F1 interface. The DUs 530 may communicate with one or more radio units (RUs) 540 via respective fronthaul links. The RUs 540 may communicate with respective UEs 104 via one or more radio frequency (RF) access links. In some implementations, the UE 104 may be simultaneously served by multiple RUs 540.

Each of the units, i.e., the CUs 510, the DUs 530, the RUs 540, as well as the Near-RT RICs 525, the Non-RT RICs 515 and the SMO Framework 505, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 510 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 510. The CU 510 may be configured to handle user plane functionality (i.e., Central Unit—User Plane (CU-UP)), control plane functionality (i.e., Central Unit—Control Plane (CU-CP)), or a combination thereof. In some implementations, the CU 510 can be logically split into one or more CU-UP units and one or more CU-CP units. The CU-UP unit can communicate bidirectionally with the CU-CP unit via an interface, such as the E1 interface when implemented in an O-RAN configuration. The CU 510 can be implemented to communicate with the DU 530, as necessary, for network control and signaling.

The DU 530 may correspond to a logical unit that includes one or more base station functions to control the operation of one or more RUs 540. In some aspects, the DU 530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 530 may further host one or more low PHY layers. Each layer (or module) can be implemented with an interface configured to communicate signals with other layers (and modules) hosted by the DU 530, or with the control functions hosted by the CU 510.

Lower-layer functionality can be implemented by one or more RUs 540. In some deployments, an RU 540, controlled by a DU 530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 540 can be implemented to handle over the air (OTA) communication with one or more UEs 104. In some implementations, real-time and non-real-time aspects of control and user plane communication with the RU(s) 540 can be controlled by the corresponding DU 530. In some scenarios, this configuration can enable the DU(s) 530 and the CU 510 to be implemented in a cloud-based RAN architecture, such as a vRAN architecture.

The SMO Framework 505 may be configured to support RAN deployment and provisioning of non-virtualized and virtualized network elements. For non-virtualized network elements, the SMO Framework 505 may be configured to support the deployment of dedicated physical resources for RAN coverage requirements which may be managed via an operations and maintenance interface (such as an O1 interface). For virtualized network elements, the SMO Framework 505 may be configured to interact with a cloud computing platform (such as an open cloud (O-Cloud) 590) to perform network element life cycle management (such as to instantiate virtualized network elements) via a cloud computing platform interface (such as an O2 interface). Such virtualized network elements can include, but are not limited to, CUs 510, DUs 530, RUs 540 and Near-RT RICs 525. In some implementations, the SMO Framework 505 can communicate with a hardware aspect of a 4G RAN, such as an open eNB (O-eNB) 511, via an O1 interface. Additionally, in some implementations, the SMO Framework 505 can communicate directly with one or more RUs 540 via an O1 interface. The SMO Framework 505 also may include a Non-RT RIC 515 configured to support functionality of the SMO Framework 505.

The Non-RT RIC 515 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 525. The Non-RT RIC 515 may be coupled to or communicate with (such as via an A1 interface) the Near-RT RIC 525. The Near-RT RIC 525 may be configured to include a logical function that enables near-real-time control and optimization of RAN elements and resources via data collection and actions over an interface (such as via an E2 interface) connecting one or more CUs 510, one or more DUs 530, or both, as well as an O-eNB, with the Near-RT RIC 525.

In some implementations, to generate AI/ML models to be deployed in the Near-RT RIC 525, the Non-RT RIC 515 may receive parameters or external enrichment information from external servers. Such information may be utilized by the Near-RT RIC 525 and may be received at the SMO Framework 505 or the Non-RT RIC 515 from non-network data sources or from network functions. In some examples, the Non-RT RIC 515 or the Near-RT RIC 525 may be configured to tune RAN behavior or performance. For example, the Non-RT RIC 515 may monitor long-term trends and patterns for performance and employ AI/ML models to perform corrective actions through the SMO Framework 505 (such as reconfiguration via O1) or via creation of RAN management policies (such as A1 policies).

Figure 6:
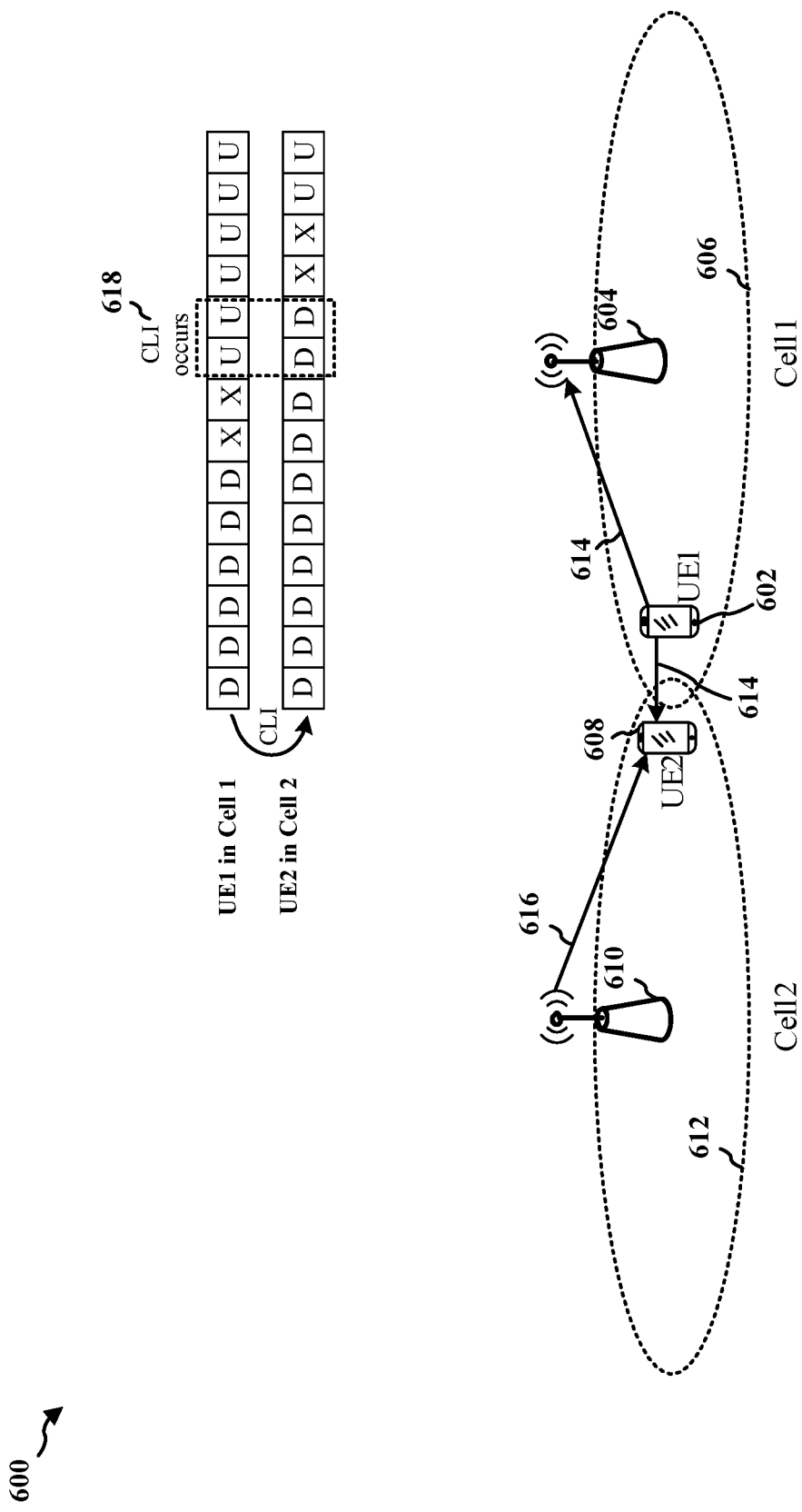
FIG. 6 is a diagram illustrating an example of a wireless network operating in a dynamic TDD configuration.

FIG. 6 is a diagram illustrating a wireless network 600 operating in a dynamic TDD configuration. Dynamic TDD may enhance spectrum efficiency of wireless communication networks and provide a higher throughput by dynamically altering UL or DL transmission direction. However, dynamic TDD may result in UE-to-UE cross link interference. For example, if nearby UEs have different TDD UL-DL slot formats, one UE (e.g., UE2 608) may be referred to as an interfered UE or a victim UE and may receive UL transmission from another UE (e.g., UE1 602) which may be referred to as an interfering UE or an aggressor UE. The received UL transmission from the UE1 602 may be referred to as cross link interference (CLI). CLI occurs when a UL symbol (e.g., an interfering symbol) of an interfering UE collides with a DL symbol (e.g., an interfered symbol) of an interfered UE. CLI may be caused by an UL transmission from the interfering UE (e.g., 602). The configuration of dynamic TDD is able to change dynamically in response to a change of traffic pattern. For example, in instances where the traffic pattern is UL heavy, dynamic TDD may recognize the change in the traffic pattern and adapt by providing more UL symbols to meet the demand. Alternatively, in instances where the traffic pattern is DL heavy, dynamic TDD may provide more DL symbols to meet the demand.

In FIG. 6, UE1 602 is within Cell1 606 and is being served by base station 604, while UE2 608 is within Cell2 612 and is being served by base station 610. CLI may occur between UEs at the cell edges of nearby cells, as UEs at cell edges of nearby cells may be in close proximity to each other. As shown in FIG. 6, UE1 602 and UE2 608 are at their respective cell edges, and may be communicating with their respective base stations. UE1 602 may send an UL transmission 614 to base station 604, while UE2 608 is receiving a DL transmission 616 from base station 610. However, in certain instances, the UL transmission 614 sent by UE1 602 to base station 604 may also be received by UE2 608 while receiving the DL transmission 616 from base station 610. The UL transmission 614 from UE1 602 received by UE2 608 causes CLI and may interfere with the DL transmission 616 received by UE2 608 from base station 610. As such, one or more UL symbols of the CLI may collide with one or more DL symbols of the DL transmission 616. As used herein, the term CLI signal is defined to be a signal that causes CLI. As further used herein, the terms CLI signal and CLI may be used interchangeably. In the example of FIG. 6, two UL symbols of the CLI signal (e.g., UL transmission 614) overlap or collide with two DL symbols of the DL transmission 616, such that CLI occurs at the overlap 618.

In wireless communication networks, sidelink communication may allow UEs to directly communicate with each via sidelink. Sidelink communication may support two modes, Mode 1 and Mode 2. In Mode 1, sidelink transmission may be scheduled by the network (e.g., base station). In Mode 2, the UEs may perform autonomous sidelink transmissions in a configured or pre-configured sidelink resource pool. Mode 2 sidelink communication may include inter-UE coordination which may allow a UE sending a sensed resource allocation to another UE. The other UE may account for the sensed resource allocation for sidelink communication in view of its own resource allocation. Inter-UE coordination may reduce resource conflict in Mode 2 sidelink communications.

In dynamic time domain duplex (TDD) configurations, neighboring cells may have different downlink (DL) and/or uplink (UL) slot configurations. For example, a slot may be used for DL transmission in one cell, while the same slot may be used in a neighboring cell for UL transmission. An issue that may arise in dynamic TDD is CLI. In CLI, an uplink transmission from a first UE in a first cell may interfere with a downlink reception of a second UE in a second cell in instances where the first UE and the second UE are using the same frequency resources. Solutions that have been implemented to mitigate CLI including using a measured CLI for downlink scheduling decisions. For example, a UE that is scheduled to receive DL may be configured to measure sounding reference signals (SRS) sent by another UE in a neighboring cell that is transmitting an UL transmission. The measured CLI based on the SRS may be provided to the base station to determine the DL scheduling of the UE scheduled to receive DL. Yet another solution may include network assisted interference cancellation. Interference cancellation operation may be applicable for DL reception, where an interfered UE proactively decodes an interfering signal from a neighboring cell, and may cancel the interference using a signal decoding. In some instances, the interference cancellation may be performed at the symbol level (SLIC). The SLIC may include channel estimation, demodulation, determining a hard decision based on the demodulation, reconstruction of a received interfering signal, interference cancellation, and detection of a desired signal. In some instances, the interference cancellation may be performed at a codeword level (CWIC). The CWIC may be similar to the SLIC, but may include additional decoding performed after the demodulation. The additional decoding may allow the CWIC to be more robust than SLIC.

CLI measurements may assist in DL scheduling and avoiding a strong interferer. The CLI measurement may result in improved performance in comparison to not accounting for CLI measurement in the DL scheduling. However, the DL reception performance may still experience interference from UL transmissions, despite the interference being reduced or non-negligible. A proactive solution that may address CLI in dynamic TTD is interference cancellation. In interference cancellation, an interfered UE receiving in DL may be configured to cancel interference from an interfering UE UL transmission in a neighbor cell. However, in order to implement interference cancellation, the interfered UE would need to have knowledge of the transmission configuration and/or parameters of the interfering UE.

Aspects presented herein provide a configuration for CLI cancellation in dynamic TDD systems. The aspects presented herein may allow for interference cancellation of uplink transmissions of an interfering UE in a neighboring cell. The uplink transmission parameters of the interfering UE may be provided to the interfered UE, such that the interference cancellation of the uplink transmissions of the interfering UE in the neighboring cell may be based on one or more of the uplink transmission parameters of the interfering UE. At least one advantage of the disclosure is that the base station associated with the serving cell serving the interfered UE may have more flexibility in scheduling for the interfered UE in dynamic TDD networks. For example, the base station may experience less constraints in scheduling DL transmissions for the interfered UE in instances where the interfering UE in the neighboring cell is transmitting UL transmissions.

In some instances, the interference cancellation may be assisted using sidelink communication. For example, the interfering UE may be configured to send its uplink transmission parameters to the interfered UE via sidelink transmission. The interfering UE transmitting the uplink transmission parameters to the interfered UE via sidelink may assist in coordination of the interfered UE interference cancellation operation. In some instances, the uplink transmission parameters may be carried in at least one of a medium access control (MAC) control element (CE) (MAC-CE), physical layer (PHY) signaling, or radio resource control (RRC) signaling. The interfering UE may send, to the interfered UE, the uplink transmission parameters that have been scheduled in a DL slot of a neighboring cell (e.g., serving cell of the interfered UE). The interfering UE may send the uplink transmission parameters that have been scheduled by either dynamic grant or configured grant. In some aspects, the interfering UE sending the uplink transmission parameters that have been scheduled via configured grant may allow the interfering UE with the timing to transmit the uplink transmission parameters via sidelink. For example, the interfering UE may receive an UL grant in slot n for UL transmission in slot n+k1. The interfering UE may send the uplink transmission parameters to the interfered UE via sidelink in slot n+k2, where k2<k1. As such, the interfering UE may transmit the uplink transmission parameters to the interfered UE via sidelink in a slot that is prior to the scheduled UL transmission slot. In some aspects, the sidelink transmission may be in a same or a different carrier.

The uplink transmission parameters may include various different parameters. For example, the uplink transmission parameters may include frequency and time domain resource allocation of the interfering UE UL transmission (e.g., PUSCH). The uplink transmission parameters may include a modulation and coding scheme (MCS) of the PUSCH, or may include a modulation order which may be utilized for SLIC. The uplink transmission parameters may include a PUSCH demodulated reference signal (DMRS) sequence initializer indicating a seed or parameters related to the seed for a sequence generator. The uplink transmission parameters may include a PUSCH scrambling sequence initialize, which may indicate the seed or parameters related to the seed. The uplink transmission parameters may include a radio network temporary identifier (RNTI) of the interfering UE or a cell identifier (ID) of the interfering UE. Not all of the uplink transmission parameters may be needed for the interfered UE to perform interference cancellation. The uplink transmission parameters utilized may be based on the interference cancellation operation.

In some instances, the interfering UE may broadcast the uplink transmission parameters to the interfered UE, such that the uplink transmission parameters are received in a sidelink broadcast transmission. In such instances, nearby UE receiving DL transmissions may detect the uplink transmission parameters of the interfering UE for the interference cancellation operation. The uplink transmission parameters of the interfering UE may be coordination information for the interference cancellation operation. In some aspects, the coordination information may comprise a destination ID that may be used in sidelink such that interfered UEs may understand that the sidelink transmission includes coordination information for interference cancellation operation. In some aspects, the interfering UE may transmit the uplink transmission parameters to the interfered UE in a unicast sidelink transmission. In such instances, the interfering UE and the interfered UE may establish a connection with each other to allow for the unicast sidelink transmission. In some aspects, the connection may comprise an RRC connection which may enhance security between the interfering UE and interfered UE, but may increase latency due to the connection establishment procedure.

UL scheduling enhancements may be beneficial to interference cancellation. For example, to facilitate the interfered UE processing of the uplink transmission of the interfering UE, the RNTI used to generate the PUSCH scrambling sequence may comprise a configured or pre-configured value or may comprise a shareable ID which may be utilized when applying CWIC. In some aspects, the PUSCH DMRS sequence may be initialized by only the cell ID, such that a scrambling ID is not configured.

The interference cancellation capability may be reported to the network. For example, the interfered UE may be configured to transmit an indication indicating support for interference cancellation. The interfered UE may transmit the indication indicating support for interference cancellation to the base station associated with the serving cell of the interfering UE or to the base station associate with interfered UE. The interfered UE supporting interference cancellation may allow the base station associated with the serving cell of the interfering UE to modify or update the uplink scheduling of the interfering UE. In some aspects, the base station associated with the serving cell of the interfering UE may schedule the interfering UE uplink transmission based on UL scheduling enhancements discussed above by default in a dynamic TDD network, or in UL or flexible slots that may be used in neighboring cells as DL slots. In some aspects, the indication may also indicate which interference cancellation operation may be performed by the interfered UE (e.g., CWIC, SLIC, etc.), such that the interfering UE or the base station associated with the serving cell of the interfering UE may determine which parameters need to be provided to the interfered UE. For example, resource allocation, DMRS sequence initializer, MCS and PUSCH scrambling sequence initializer may be utilized for CWIC, while resource allocation, DMRS sequence initializer, and modulation order may be utilized for SLIC.

In some aspects, the coordination information may be received by the interfered UE from the base station associated with the serving cell serving the interfered UE. In such instances, the interfered UE does not receive the coordination information or uplink transmission parameters of the interfering UE via sidelink. Instead, the base station associated with the serving cell of the interfering UE may provide the coordination information or uplink transmission parameters of the interfering UE to the base station associated with the service cell of the interfered UE, which in turn provides the coordination information or uplink transmission parameters of the interfering UE to the interfered UE. The interfered UE may then utilize the coordination information to perform interference cancellation operation. In some aspects, the base station associated with the serving cell of the interfering UE may provide the coordination information or uplink transmission parameters of the interfering UE to the base station associated with the service cell of the interfered UE via an X2 or an Xn interface.

The interference cancellation operation may be enabled based on the interfered UE's capabilities. For example, in instances where the interfered UE supports interference cancellation, the base station serving the interfered UE may schedule DL transmission to the interfered UE without considering CLI. However, in some aspects, CLI may be accounted for in the DL transmission schedule of the interfered UE. For example, the CLI measurement may be configured by the base station associated with the serving cell serving the interfered UE, which may allow the interfered UE to measure the uplink transmission of the interfering UE. The interfered UE may measure SRS-RSRP of the uplink transmission of the interfering UE to perform the CLI measurement. The base station associated with the serving cell serving the interfered UE may adjust downlink scheduling for the interfered UE based on the CLI measurement. For example, in some aspects, if the CLI measurement (e.g., SRS-RSRP) in a resource is greater than a first threshold, the base station may not schedule DL transmission for the interfered UE in the resource. In some aspects, if the CLI measurement is less than the first threshold, but is greater than a second threshold, the base station may schedule DL transmission to the interfered UE in the resource if the first UE supports interference cancellation. In some aspects, if the CLI measurement is less than the second threshold, the base station may schedule DL transmission to the interfered UE in the resource regardless of the first UE's ability to support interference cancellation.

Figure 7:
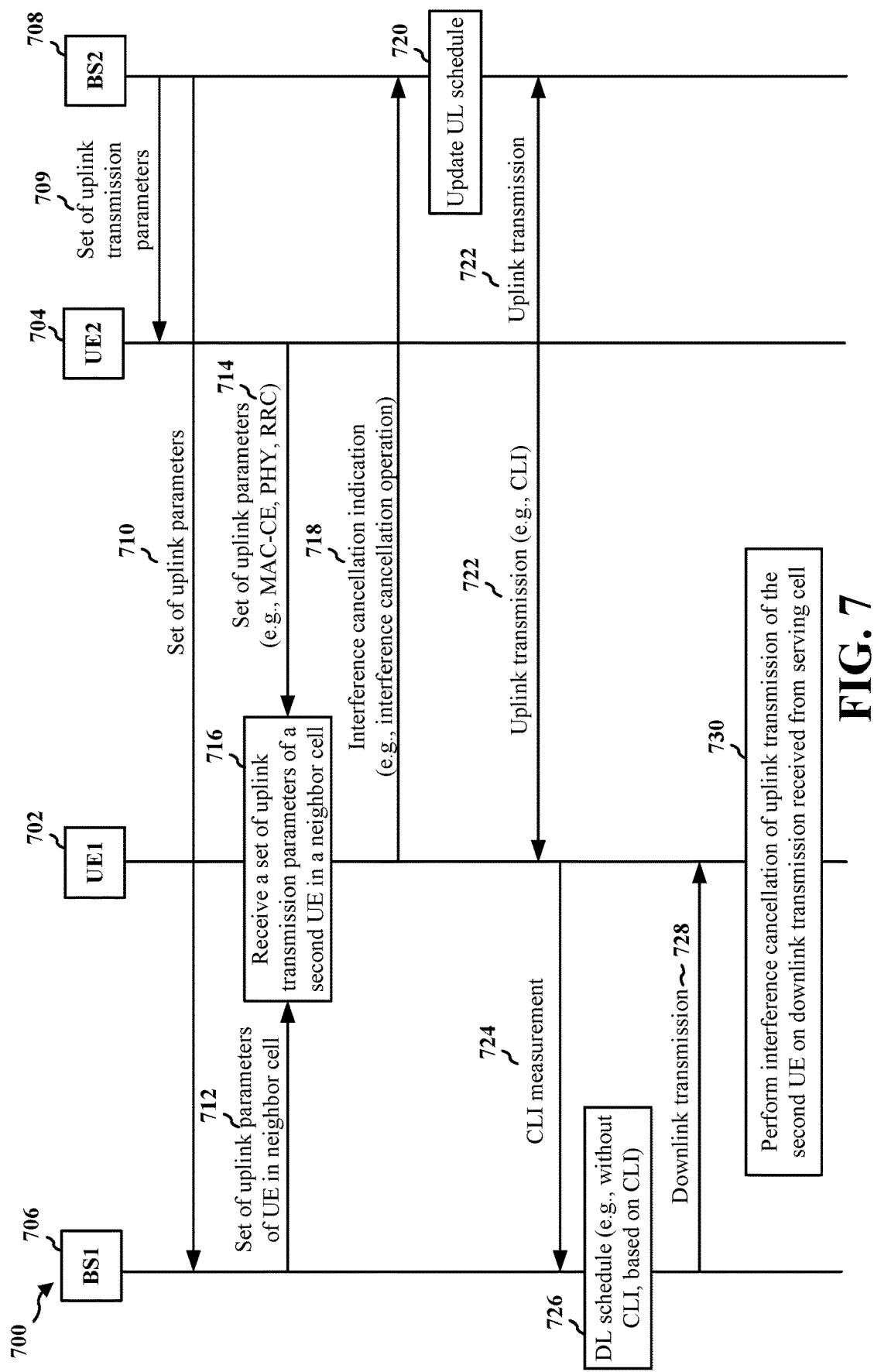
FIG. 7 is a call flow diagram of signaling between a first UE, a second UE, a first base station, and a second base station.

FIG. 7 is a call flow diagram 700 of signaling between a first UE 702, a second UE 704, a first base station 706, and a second base station 708. The first base station 706 and the second base station 708 may be configured to provide at least one cell. The first UE 702 may be configured to communicate with the first base station 706, while second UE 704 may be configured to communication with the second base station 708. For example, in the context of FIG. 1, the first base station 706 and the second base station 708 may correspond to base station 102/180 and, accordingly, the cell may include a geographic coverage area 110 in which communication coverage is provided and/or small cell 102' having a coverage area 110'. Further, first UE 702 and/or the second UE 704 may correspond to at least UE 104. In another example, in the context of FIG. 3, the first base station 706 and/or the second base station 708 may correspond to base station 310 and the first UE 702 and/or the second UE 704 may correspond to UE 350.

As illustrated at 709, the second UE 704 may obtain a set of uplink transmission parameters from the second base station 708. The second base station 708 may configure the uplink transmission parameters for the second UE 704 for communication with the second base station 708. The second base station may be associated with the serving cell serving the second UE 704.

As illustrated at 716, the first UE 702 may receive the set of uplink transmission parameters of a second UE. In some aspects, the set of uplink transmission parameters of the second UE may be received from the second UE via sidelink communication. In some aspects, the set of uplink transmission parameters may be received in a sidelink broadcast transmission. In some aspects, the set of uplink transmission parameters may be received via at least one of a MAC-CE, PHY signaling, or RRC signaling. In some aspects, the set of uplink transmission parameters of the second UE may correspond to the uplink transmission scheduled for the second UE in a downlink slot for the first UE. The set of uplink transmission parameters may comprise at least one of a frequency domain resource allocation or a time domain resource allocation of the uplink transmission of the second UE, a MCS of the uplink transmission of the second UE, a DMRS sequence initializer of the uplink transmission of the second UE, a scrambling sequence initializer of the uplink transmission of the second UE, a RNTI of the second UE, or a cell ID of the second UE. In some aspects, the set of uplink transmission parameters may comprise coordination information indicating that the set of uplink transmission parameters are related to the interference cancellation. In some aspects, at least one uplink transmission parameter of the set of uplink transmission parameters may include a scrambling sequence based on one or more of a common value, a value that does not identify the second UE, or a cell ID.

To receive the set of uplink transmission parameters of the second UE in the neighbor cell, the first UE 702, in some aspects, may receive the set of uplink transmission parameters of the second UE from the first base station 706. The first base station 706 may be associated with the serving cell serving the first UE. For example, as illustrated at 712, the first base station may provide the set of uplink transmission parameters of the second UE to the first UE. The first UE may receive the set of uplink transmission parameters from the first base station. To provide the set of uplink parameters of the second UE to the first UE, the first base station, as illustrated at 710, may receive the set of uplink parameters of the second UE in the neighbor cell from a second base station 708 associated with the neighbor cell serving the second UE. The second base station 708 may provide the uplink transmission parameters of the second UE to the first base station 706 associated with the serving cell serving the first UE. The first base station may then provide the uplink transmission parameters of the second UE to the first UE.

To receive the set of uplink transmission parameters of the second UE in the neighbor cell, the first UE 702, in some aspects, may establish a connection with the second UE 704. For example, as illustrated at 714, the first UE and the second UE may establish a connection with each other. In some aspects, the first UE may establish the connection with the second UE. In some aspects, the second UE may establish the connection with the first UE. The first UE may establish the connection with the second UE such that the set of uplink transmission parameters are received in a unicast transmission from the second UE. The second UE may establish the connection with the first UE such that the set of uplink transmission parameters are received, by the first UE, in a unicast transmission from the second UE. In some aspects, the connection between the first UE and the second UE may comprise an RRC connection. The RRC connection between the first UE and the second UE may provide a secure connection to allow for the sharing of the uplink transmission parameters of the second UE. In some aspects, the first UE may establish the connection with the second UE in instances where the downlink or uplink transmissions of the either or both of the first UE and the second UE are scheduled via configured grant.

As illustrated at 718, the first UE 702 may provide an indication indicating support for the interference cancellation. The first UE may provide the indication indicating support for the interference cancellation to the second base station 708. The second base station 708 may receive the indication indicating support for the interference cancellation. The second base station 708 may be associated with the neighbor cell that is serving the second UE 704. The second base station 708, at 720, may be configured to adjust or update a scheduling of the uplink transmission of the second UE. Adjusting of the uplink transmission schedule of the second UE may allow for processing of the uplink transmission received by the first UE, from the second UE, in response to the indication indicating that the first UE supports the interference cancellation.

In some aspects, the first UE may indicate a type of interference cancellation operation to be performed by the first UE. The first UE may indicate the type of interference cancellation operation to be performed by the first UE to the second base station. The second base station may receive the indication indicating the type of interference cancellation operation to be performed by the first UE. The base station may be associated with the neighbor cell serving the second UE. In some aspects, the type of interference cancellation operation to be performed by the first UE may be included with the indication indicating support for the interference cancellation. In some aspects, the interference cancellation operation may comprise CWIC, SLIC, or the like. In some aspects, the indication of the type of interference cancellation operation may be included with the indication indicating support for the interference cancellation.

As illustrated at 722, the second UE 704 may transmit an uplink transmission. The second UE may transmit the uplink transmission to the second base station 708. The second base station may receive the uplink transmission from the second UE. The uplink transmission may also be received by the first UE 702, in the form of CLI. The first UE 702 may receive the uplink transmission in the form of CLI from the second UE 704. The first UE may measure SRS reference signal received power (RSRP) of the uplink transmission of the second UE to perform a CLI measurement.

As illustrated at 724, the first UE 702 may transmit CLI measurement based on the uplink transmission of the second UE 704 to the first base station 706. The first base station may receive the CLI measurement from the first UE. The first base station may be associated with the serving cell serving the first UE. The CLI measurement may be configured by the first base station, which may allow the first UE to measure the uplink transmission of the second UE. The first UE may measure SRS-RSRP of the uplink transmission of the second UE to perform the CLI measurement.

As illustrated at 726, the first base station may configure the downlink transmission schedule for the first UE 702. In some aspects, the first base station may schedule a downlink transmission for the first UE without adjustment for cross link interference measurements. The first base station may schedule the downlink transmission for the first UE without adjustment for cross link interference measurements in instances where the first UE supports the interference cancellation. In some aspects, the first UE may provide an indication to the first base station that the first UE supports the interference cancellation. The first base station may schedule the downlink transmission for the first UE without adjustment for cross link interference measurements in response to receipt of the indication indicating that the first UE supports the interference cancellation.

In some aspects, for example in response to receipt of the CLI measurement, the first base station may adjust downlink scheduling for the first UE based on the CLI measurement. The first base station associated with the serving cell serving the first UE may adjust downlink scheduling for the first UE based on the CLI measurement. For example, in some aspects, if the CLI measurement (e.g., SRS-RSRP) in a resource is greater than a first threshold, the base station may not schedule DL transmission for the first UE in the resource. In some aspects, if the CLI measurement is less than the first threshold, but is greater than a second threshold, the base station may schedule DL transmission to the first UE in the resource if the first UE supports interference cancellation. In some aspects, if the CLI measurement is less than the second threshold, the base station may schedule DL transmission to the first UE in the resource regardless of the first UE's ability to support interference cancellation.

As illustrated at 728, the first base station may transmit a downlink transmission to the first UE. The first base station may transmit the downlink transmission to the first UE based on the downlink scheduled. In some aspects, the downlink schedule may be adjusted or updated based on the CLI measurement received from the first base station. In some aspects, the downlink schedule may be scheduled without consideration of the CLI measurement.

As illustrated at 730, the first UE 702 may perform interference cancellation of the uplink transmission of the second UE on the downlink transmission received from the first base station associated with the serving cell serving the first UE. The interference cancellation may be based at least on the set of uplink transmission parameters of the second UE.

Figure 8:
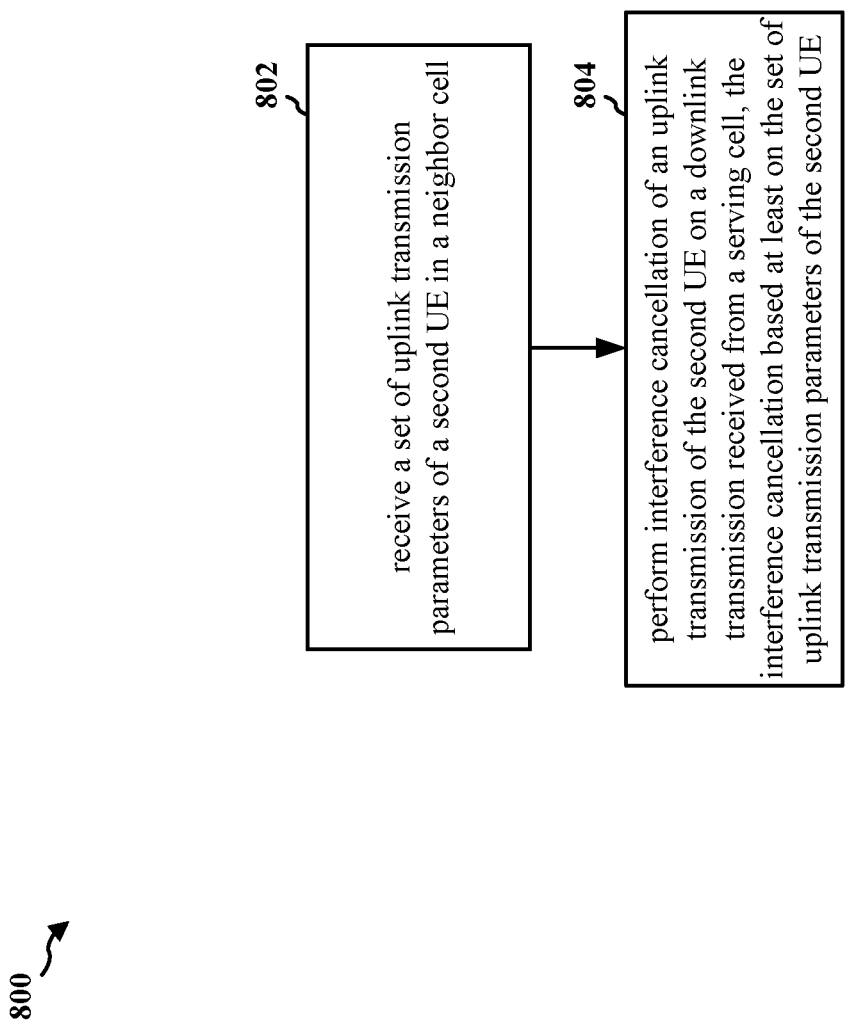
FIG. 8 is a flowchart of a method of wireless communication.

FIG. 8 is a flowchart 800 of a method of wireless communication. The method may be performed by a first UE (e.g., the UE 104; the apparatus 1002). One or more of the illustrated operations may be omitted, transposed, or contemporaneous. The method may allow a first UE (e.g., interfered UE) to perform interference cancellation of transmission from a second UE (e.g., interfering UE) in dynamic TDD systems.

At 802, the first UE may receive a set of uplink transmission parameters of a second UE. For example, 802 may be performed by UL TX parameters component 1040 of apparatus 1002. In some aspects, the set of uplink transmission parameters of the second UE may be received from the second UE via sidelink communication. In some aspects, the set of uplink transmission parameters may be received in a sidelink broadcast transmission. In some aspects, the set of uplink transmission parameters may be received via at least one of a MAC-CE, PHY signaling, or RRC signaling. In some aspects, the set of uplink transmission parameters of the second UE may correspond to the uplink transmission scheduled for the second UE in a downlink slot for the first UE. The set of uplink transmission parameters may comprise at least one of a frequency domain resource allocation or a time domain resource allocation of the uplink transmission of the second UE, a MCS of the uplink transmission of the second UE, a DMRS sequence initializer of the uplink transmission of the second UE, a scrambling sequence initializer of the uplink transmission of the second UE, a RNTI of the second UE, or a cell ID of the second UE. In some aspects, the set of uplink transmission parameters may comprise coordination information indicating that the set of uplink transmission parameters are related to the interference cancellation. In some aspects, at least one uplink transmission parameter of the set of uplink transmission parameters may be utilized to generate a scrambling sequence. The at least one uplink transmission parameter may be based on one or more of a configured value or pre-configured value, a value that does not identify the second UE, or a cell ID.

At 804, the first UE may perform interference cancellation. For example, 804 may be performed by interference cancellation component 1044 of apparatus 1002. The first UE may perform interference cancellation of an uplink transmission of the second UE on a downlink transmission received from a serving cell serving the first UE. The interference cancellation may be based at least on the set of uplink transmission parameters of the second UE.

Figure 9:
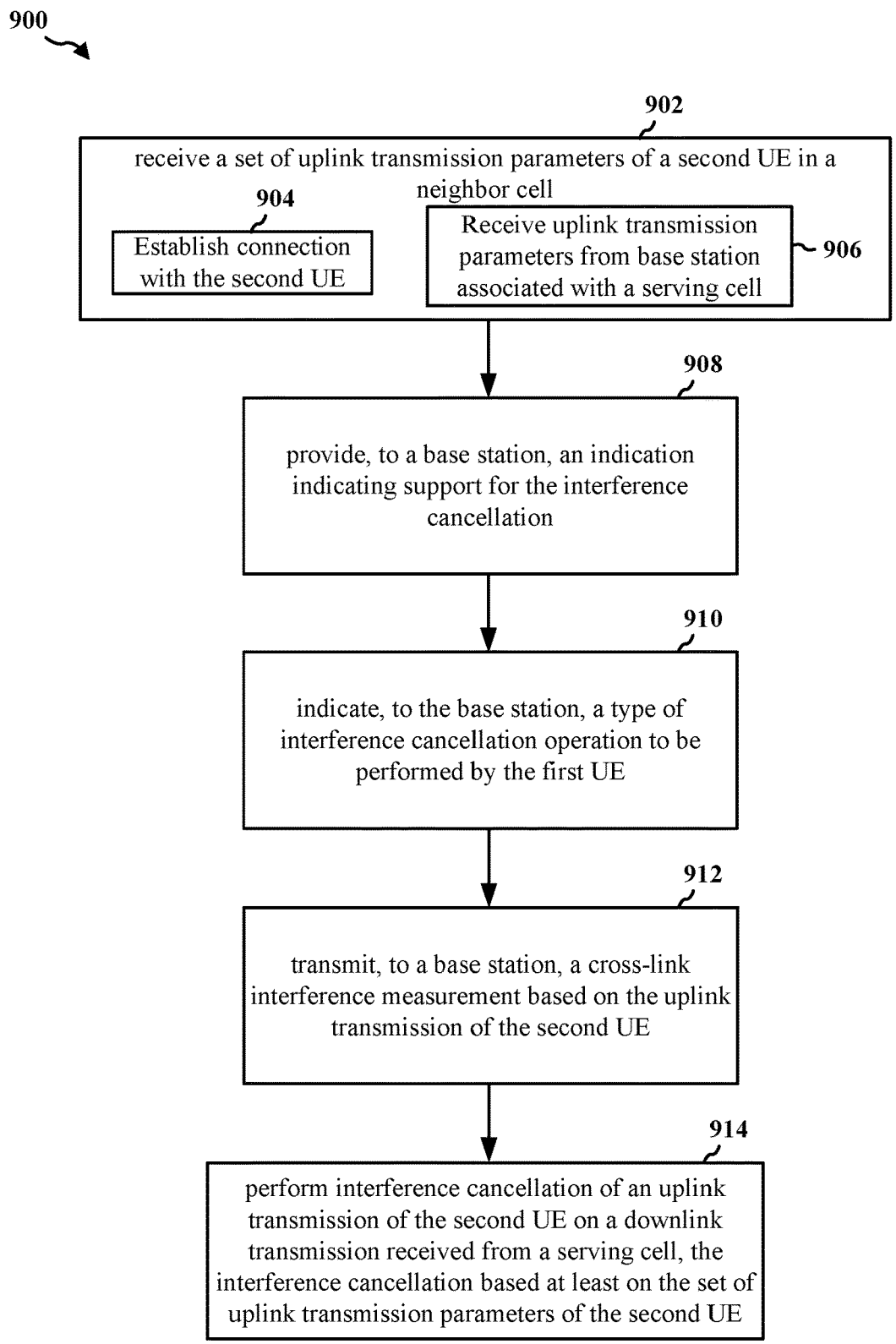
FIG. 9 is a flowchart of a method of wireless communication.

FIG. 9 is a flowchart 900 of a method of wireless communication. The method may be performed by a UE (e.g., the UE 104; the apparatus 1002). One or more of the illustrated operations may be omitted, transposed, or contemporaneous. The method may allow a first UE (e.g., interfered UE) to perform interference cancellation of transmission from a second UE (e.g., interfering UE) in dynamic TDD systems.

At 902, the first UE may receive a set of uplink transmission parameter of a second UE. For example, 902 may be performed by UL TX parameters component 1040 of apparatus 1002. In some aspects, the set of uplink transmission parameters of the second UE may be received from the second UE via sidelink communication. In some aspects, the set of uplink transmission parameters may be received in a sidelink broadcast transmission. In some aspects, the set of uplink transmission parameters may be received via at least one of a MAC-CE, PHY signaling, or RRC signaling. In some aspects, the set of uplink transmission parameters of the second UE may correspond to the uplink transmission scheduled for the second UE in a downlink slot for the first UE. The set of uplink transmission parameters may comprise at least one of a frequency domain resource allocation or a time domain resource allocation of the uplink transmission of the second UE, a MCS of the uplink transmission of the second UE, a DMRS sequence initializer of the uplink transmission of the second UE, a scrambling sequence initializer of the uplink transmission of the second UE, a RNTI of the second UE, or a cell ID of the second UE. In some aspects, the set of uplink transmission parameters may comprise coordination information indicating that the set of uplink transmission parameters are related to the interference cancellation. In some aspects, at least one uplink transmission parameter of the set of uplink transmission parameters may be utilized to generate a scrambling sequence. The scrambling sequence may be based on one or more of a configured value or pre-configured value, a value that does not identify the second UE, or a cell ID.

At 904, to receive the set of uplink transmission parameters of the second UE, the first UE may establish a connection with the second UE. For example, 904 may be performed by connection component 1042 of apparatus 1002. The first UE may establish the connection with the second UE such that the set of uplink transmission parameters are received in a unicast transmission from the second UE. In some aspects, the connection between the first UE and the second UE may comprise an RRC connection. The RRC connection between the first UE and the second UE may provide a secure connection to allow for the sharing of the uplink transmission parameters of the second UE. In some aspects, the first UE may establish the connection with the second UE in instances where the downlink or uplink transmissions of the either or both of the first UE and the second UE are scheduled via configured grant.

At 906, to receive the set of uplink transmission parameters of the second UE, the first UE may receive the set of uplink transmission parameters from a base station associated with the serving cell. For example, 906 may be performed by UL TX parameters component 1040 of apparatus 1002. For example, the base station associated with the neighbor cell serving the second UE may provide the uplink transmission parameters of the second UE to the base station associated with the serving cell serving the first UE. The base station associated with the serving cell serving the first UE may then provide the uplink transmission parameters of the second UE to the first UE.

At 908, the first UE may provide an indication indicating support for the interference cancellation. For example, 908 may be performed by interference cancellation component 1044 of apparatus 1002. The first UE may provide the indication indicating support for the interference cancellation to the base station. The first UE may provide the indication indicating support for the interference cancellation to the base station associated with the neighbor cell serving the second UE. The scheduling of the uplink transmission of the second UE may be adjusted to allow for processing of the uplink transmission received by the first UE, from the second UE, in response to the indication indicating that the first UE supports the interference cancellation.

At 910, the first UE may indicate a type of interference cancellation operation to be performed by the first UE. For example, 910 may be performed by operation component 1046 of apparatus 1002. The first UE may indicate the type of interference cancellation operation to be performed by the first UE to the base station. The base station may be associated with the neighbor cell serving the second UE. In some aspects, the type of interference cancellation operation to be performed by the first UE may be included with the indication indicating support for the interference cancellation. In some aspects, the interference cancellation operation may comprise CWIC, SLIC, or the like.

At 912, the first UE may transmit CLI measurement. For example, 912 may be performed by CLI measurement component 1048 of apparatus 1002. The first UE may transmit the CLI measurement based on the uplink transmission of the second UE. The first UE may transmit the CLI measurement to a base station. The base station may be associated with the serving cell serving the first UE. The CLI measurement may be configured by the base station, which may allow the first UE to measure the uplink transmission of the second UE. The first UE may measure SRS reference signal received power (RSRP) of the uplink transmission of the second UE to perform the CLI measurement. In some aspects, if the CLI measurement (e.g., SRS-RSRP) in a resource is greater than a first threshold, the base station may not schedule DL transmission for the first UE in the resource. In some aspects, if the CLI measurement is less than the first threshold, but is greater than a second threshold, the base station may schedule DL transmission to the first UE in the resource if the first UE supports interference cancellation. In some aspects, if the CLI measurement is less than the second threshold, the base station may schedule DL transmission to the first UE in the resource regardless of the first UE's ability to support interference cancellation.

At 914, the first UE may perform interference cancellation. For example, 914 may be performed by interference cancellation component 1044 of apparatus 1002. The first UE may perform interference cancellation of an uplink transmission of the second UE on a downlink transmission received from a serving cell serving the first UE. The interference cancellation may be based at least on the set of uplink transmission parameters of the second UE.

Figure 10:
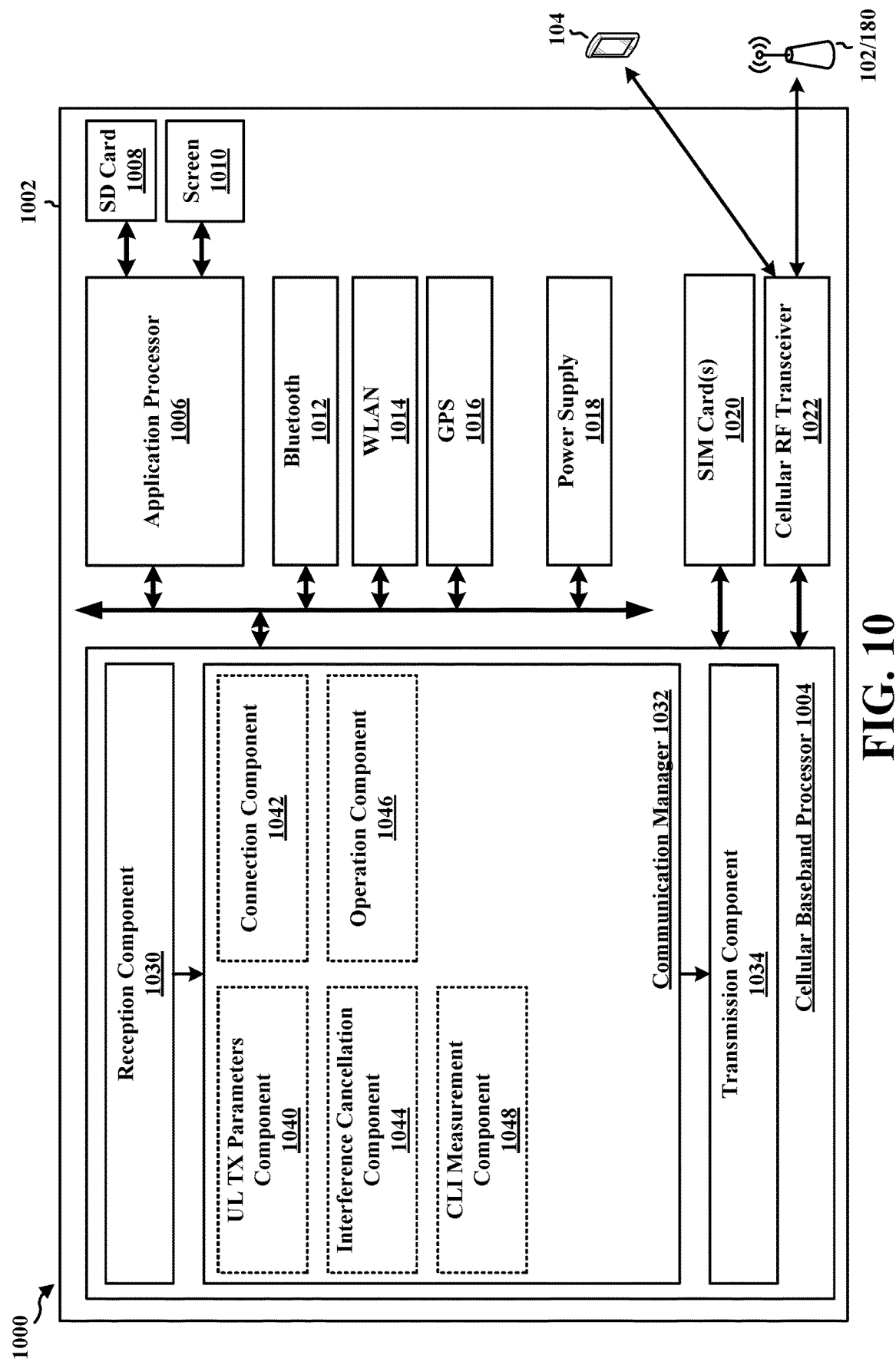
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE, a component of a UE, or may implement UE functionality. In some aspects, the apparatus 1002 may include a cellular baseband processor 1004 (also referred to as a modem) coupled to a cellular RF transceiver 1022. In some aspects, the apparatus 1002 may further include one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, or a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the cellular baseband processor 1004, and in another configuration, the apparatus 1002 may be the entire UE (e.g., see 350 of FIG. 3) and include the additional modules of the apparatus 1002.

The communication manager 1032 includes a UL TX parameters component 1040 that is configured to receive a set of uplink transmission parameter of a second UE, e.g., as described in connection with 802 of FIG. 8 or 914 of FIG. 9. The UL TX parameters component 1040 may be further configured to receive the set of uplink transmission parameters from a base station associated with the serving cell, e.g., as described in connection with 906 of FIG. 9. The communication manager 1032 further includes a connection component 1042 that is configured to establish a connection with the second UE, e.g., as described in connection with 904 of FIG. 9. The communication manager 1032 further includes an interference cancellation component 1044 that is configured to provide an indication indicating support for the interference cancellation, e.g., as described in connection with 908 of FIG. 9. The interference cancellation component 1044 may be further configured to perform interference cancellation, e.g., as described in connection with 804 of FIG. 8 or 914 of FIG. 9. The communication manager 1032 further includes an operation component 1046 that is configured to indicate a type of interference cancellation operation to be performed by the first UE, e.g., as described in connection with 910 of FIG. 9. The communication manager 1032 further includes a CLI measurement component 1048 that is configured to transmit CLI measurement, e.g., as described in connection with 912 of FIG. 9.

The apparatus may include additional components that perform each of the blocks of the algorithm in the flowcharts of FIGS. 8 and 9. As such, each block in the flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the cellular baseband processor 1004, includes means for receiving a set of uplink transmission parameters of a second UE in a neighbor cell. The apparatus includes means for performing interference cancellation of an uplink transmission of the second UE on a downlink transmission received from a serving cell. The interference cancellation based at least on the set of uplink transmission parameters of the second UE. The apparatus further includes means for establishing a connection with the second UE, wherein the set of uplink transmission parameters are received in a unicast transmission. The apparatus further includes means for receiving the set of uplink transmission parameters of the second UE from a base station associated with the serving cell. The apparatus further includes means for providing, to a base station, an indication indicating support for the interference cancellation. The apparatus further includes means for indicating, to the base station, a type of interference cancellation operation to be performed by the first UE. The apparatus further includes means for transmitting, to a base station, a cross-link interference measurement based on the uplink transmission of the second UE. The means may be one or more of the components of the apparatus 1002 configured to perform the functions recited by the means. As described supra, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 11:
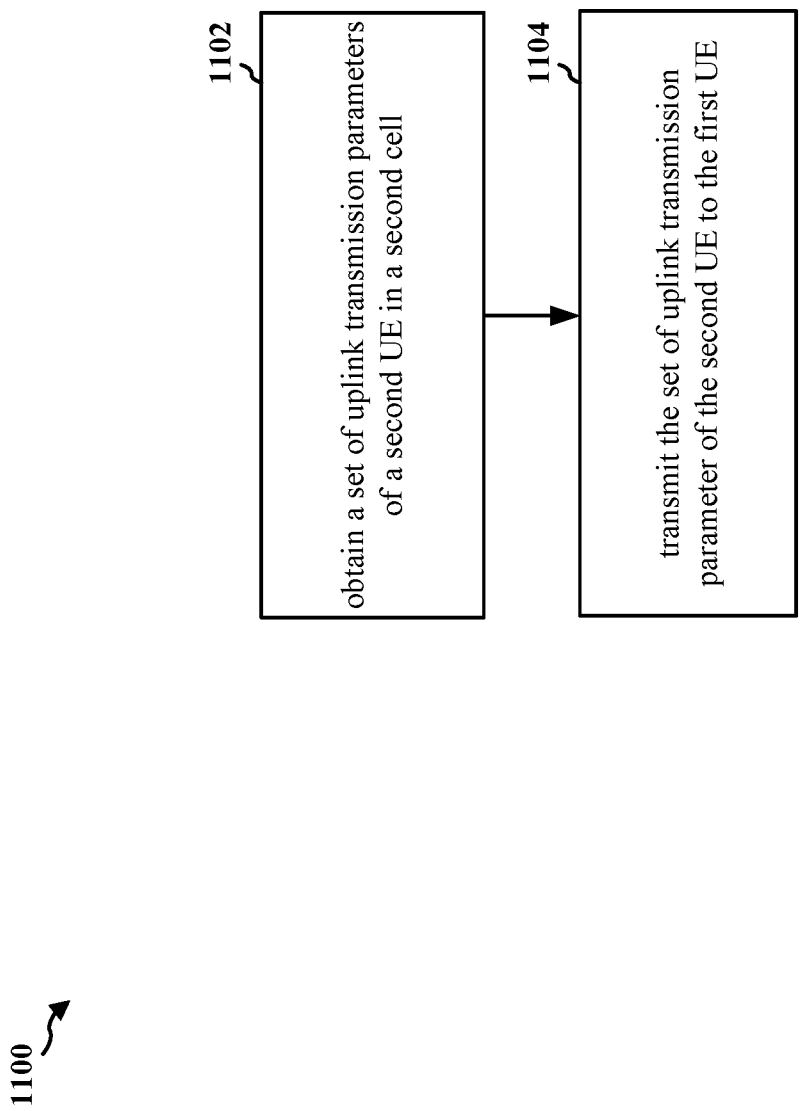
FIG. 11 is a flowchart of a method of wireless communication.

FIG. 11 is a flowchart 1100 of a method of wireless communication to a first UE. In some aspects, the method may be performed by a network node or network entity (e.g., the base station 102/180 or a component of the base station 102/180; the apparatus 1302). The network entity or network node may be implemented as a base station (i.e., an aggregated base station), as a disaggregated base station, an IAB node, a relay node, a CU, a DU, a RU, a Near-RT RIC, or a Non-RT RIC in a disaggregated base station architecture, etc. In some aspects, the method may be performed by a UE (e.g., the UE 104; the apparatus 1302). One or more of the illustrated operations may be omitted, transposed, or contemporaneous. The method may provide uplink transmission parameters of a second UE to a first UE allow for the first UE to perform interference cancellation based on uplink transmission parameters of the second UE.

At 1102, the apparatus may obtain a set of uplink transmission parameters of a second UE in a second cell. For example, 1102 may be performed by UL TX parameters component 1340 of apparatus 1302. The set of uplink transmission parameters may comprise at least one of a frequency domain resource allocation or a time domain resource allocation of the uplink transmission of the second UE, a MCS of the uplink transmission of the second UE, a DMRS sequence initializer of the uplink transmission of the second UE, a scrambling sequence initializer of the uplink transmission of the second UE, a RNTI of the second UE, or a cell ID of the second UE.

At 1104, the apparatus may transmit the set of uplink transmission parameters of the second UE to the first UE. For example, 1104 may be performed by UL TX parameters component 1340 of apparatus 1302. In some aspects, the apparatus comprises the second UE, wherein the second UE transmits the set of uplink transmission parameters of the second UE to the first UE. The second UE may transmit the set of uplink transmission parameters of the second UE to the first UE via sidelink communication. In some aspects, set of uplink transmission parameters may be transmitted via at least one of a MAC-CE, PHY signaling, or RRC signaling. In some aspects, the set of uplink transmission parameters of the second UE may correspond to an uplink transmission scheduled for the second UE in a downlink slot for the first UE. In some aspects, the set of uplink transmission parameters may be transmitted in a broadcast transmission. In some aspects, the set of uplink transmission parameters may comprise coordination information indicating that the set of uplink transmission parameters are related to the interference cancellation. In some aspects, an uplink transmission of the second UE may include a scrambling sequence. The scrambling sequence may be generated based on at least one uplink transmission parameter of the set of transmission parameters. The scrambling sequence may be based on one or more of a configured value or a pre-configured value, a value that does not identify the second UE, or a cell ID.

Figure 12:
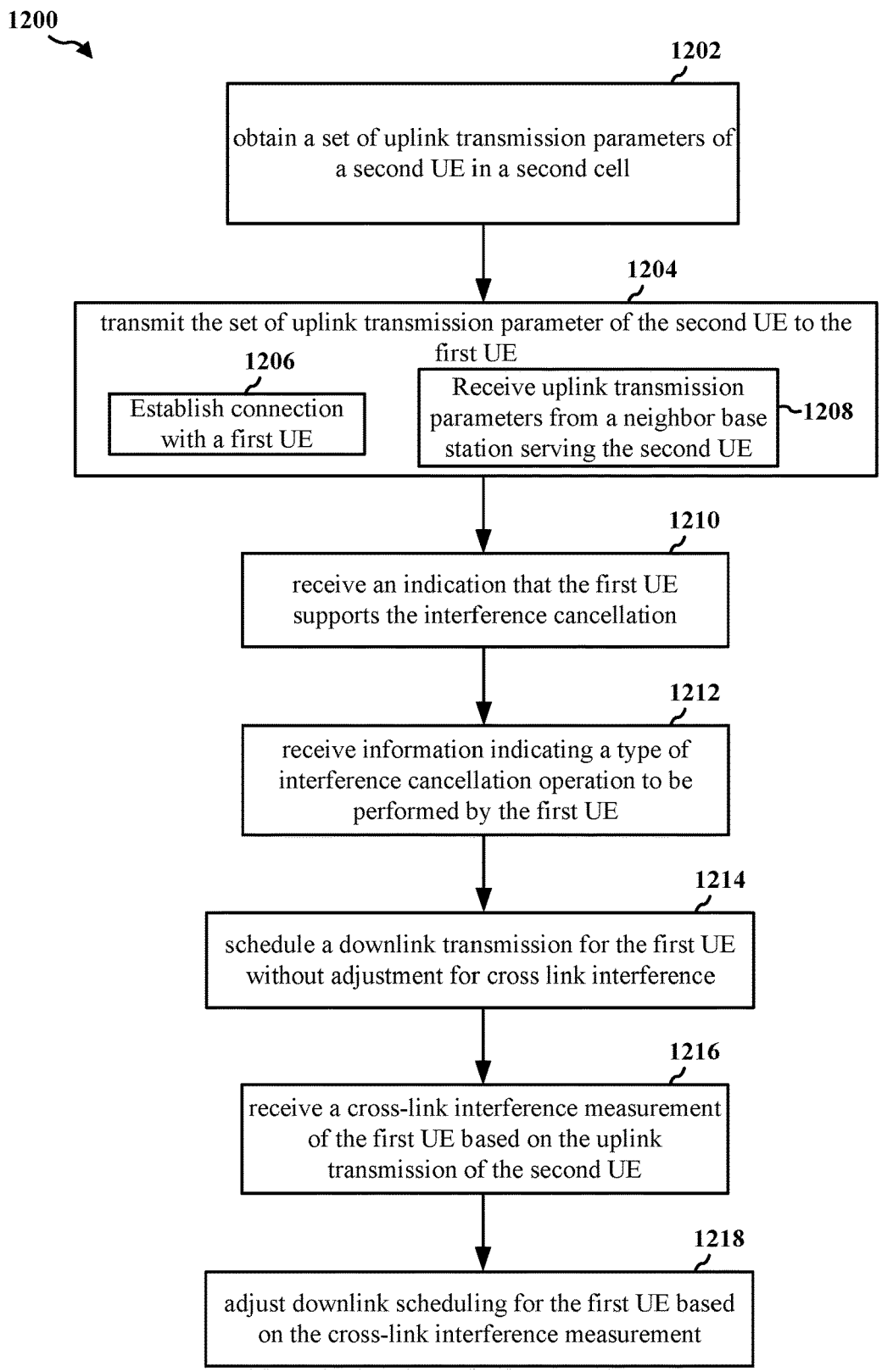
FIG. 12 is a flowchart of a method of wireless communication.

FIG. 12 is a flowchart 1200 of a method of wireless communication to a first UE. In some aspects, the method may be performed by a network node or a network entity (e.g., the base station 102/180 or a component of the base station 102/180; the apparatus 1302). The network entity or network node may be implemented as a base station (i.e., an aggregated base station), as a disaggregated base station, an IAB node, a relay node, a CU, a DU, a RU, a Near-RT RIC, or a Non-RT RIC in a disaggregated base station architecture, etc. In some aspects, the method may be performed by a UE (e.g., the UE 104; the apparatus 1302). One or more of the illustrated operations may be omitted, transposed, or contemporaneous. The method may provide uplink transmission parameters of a second UE to a first UE allow for the first UE to perform interference cancellation based on uplink transmission parameters of the second UE.

At 1202, the apparatus may obtain a set of uplink transmission parameters of a second UE in a second cell. For example, 1202 may be performed by UL TX parameters component 1340 of apparatus 1302. The set of uplink transmission parameters may comprise at least one of a frequency domain resource allocation or a time domain resource allocation of the uplink transmission of the second UE, a MCS of the uplink transmission of the second UE, a DMRS sequence initializer of the uplink transmission of the second UE, a scrambling sequence initializer of the uplink transmission of the second UE, a RNTI of the second UE, or a cell ID of the second UE.

At 1204, the apparatus may transmit the set of uplink transmission parameters of the second UE to the first UE. For example, 1204 may be performed by UL TX parameters component 1340 of apparatus 1302. In some aspects, the apparatus comprises the second UE, wherein the second UE transmits the set of uplink transmission parameters of the second UE to the first UE. The second UE may transmit the set of uplink transmission parameters of the second UE to the first UE via sidelink communication. In some aspects, set of uplink transmission parameters may be transmitted via at least one of a MAC-CE, PHY signaling, or RRC signaling. In some aspects, the set of uplink transmission parameters of the second UE may correspond to an uplink transmission scheduled for the second UE in a downlink slot for the first UE. In some aspects, the set of uplink transmission parameters may be transmitted in a broadcast transmission. In some aspects, the set of uplink transmission parameters may comprise coordination information indicating that the set of uplink transmission parameters are related to the interference cancellation. In some aspects, an uplink transmission of the second UE may include a scrambling sequence. The scrambling sequence may be generated based on at least one uplink transmission parameter of the set of transmission parameters. The scrambling sequence may be based on one or more of a configured value or a pre-configured value, a value that does not identify the second UE, or a cell ID.

At 1206, to transmit the set of uplink transmission parameters of the second UE to the first UE, the apparatus may establish a connection with the first UE. For example, 1206 may be performed by connection component 1342 of apparatus 1302. The apparatus may establish the connection with the first UE such that set of uplink transmission parameters may be transmitted in a unicast transmission from the apparatus. In some aspects, the apparatus comprises the second UE, such that the second UE may establish the connection with the first UE such that set of uplink transmission parameters may be transmitted in a unicast transmission from the second UE. In some aspects, the connection between the first UE and the second UE may comprise an RRC connection. The RRC connection between the first UE and the second UE may provide a secure connection to allow for the sharing of the uplink transmission parameters of the second UE. In some aspects, the first UE and the second UE may establish the connection with each other in instances where the downlink or uplink transmissions of the either or both of the first UE and the second UE are scheduled via configured grant.

At 1208, to transmit the set of uplink transmission parameters of the second UE to the first UE, the apparatus may receive the set of uplink transmission parameters from a neighbor base station serving the second UE. For example, 1208 may be performed by UL TX parameters component 1340 of apparatus 1302. In some aspects, the apparatus may comprise a network entity serving the first UE. The network entity serving the first UE may receive the set of uplink transmission parameters from a neighbor base station serving the second UE. For example, the base station associated with the neighbor cell serving the second UE may provide the uplink transmission parameters of the second UE to the base station associated with the serving cell serving the first UE. The base station associated with the serving cell serving the first UE may then provide the uplink transmission parameters of the second UE to the first UE.

At 1210, the apparatus may receive an indication that the first UE supports the interference cancellation. For example, 1210 may be performed by interference cancellation component 1344 of apparatus 1302. A transmission of the set of uplink transmission parameters may be provided to the first UE based on the first UE supporting the interference cancellation. The apparatus receives the indication from the first UE. In some aspects, the apparatus may comprise a base station associated with a neighbor cell serving the second UE. The base station associated with a neighbor cell serving the second UE may receive an indication that the first UE supports the interference cancellation. The scheduling of the uplink transmission of the second UE may be adjusted to allow for processing of the uplink transmission received by the first UE, from the second UE, in response to the indication indicating that the first UE supports the interference cancellation.

At 1212, the apparatus may receive information indicating a type of interference cancellation operation to be performed by the first UE. For example, 1212 may be performed by operation component 1346 of apparatus 1302. In some aspects, the apparatus may comprise a base station associated with the neighbor cell serving the second UE. The base station associated with the neighbor cell serving the second UE may receive information indicating a type of interference cancellation operation to be performed by the first UE. In some aspects, the type of interference cancellation operation to be performed by the first UE may be included with the indication indicating support for the interference cancellation. In some aspects, the interference cancellation operation may comprise codeword level interference cancellation CWIC, SLIC, or the like.

At 1214, the apparatus may schedule a downlink transmission for the first UE without adjustment for cross link interference measurements. For example, 1214 may be performed by schedule component 1348 of apparatus 1302. The apparatus may schedule a downlink transmission for the first UE without adjustment for cross link interference measurements in response to receipt of the indication indicating that the first UE supports the interference cancellation.

At 1216, the apparatus may receive a CLI measurement. For example, 1216 may be performed by CLI measurement component 1350 of apparatus 1302. In some aspects, the apparatus may comprise the base station associated with the serving cell serving the first UE. The base station associated with the serving cell serving the first UE may receive the CLI measurement of the first UE based on the uplink transmission of the second UE. The CLI measurement may be configured by the base station, which may allow the first UE to measure the uplink transmission of the second UE.

The first UE may measure SRS-RSRP of the uplink transmission of the second UE to perform the CLI measurement. The first UE may provide the CLI measurement to the base station associated with the serving cell serving the first UE.

At 1218, the apparatus may adjust downlink scheduling for the first UE based on the CLI measurement. For example, 1218 may be performed by schedule component 1348 of apparatus 1302. In some aspects, the apparatus comprises base station associated with the serving cell serving the first UE. The base station associated with the serving cell serving the first UE may adjust downlink scheduling for the first UE based on the CLI measurement. For example, in some aspects, if the CLI measurement (e.g., SRS-RSRP) in a resource is greater than a first threshold, the base station may not schedule DL transmission for the first UE in the resource. In some aspects, if the CLI measurement is less than the first threshold, but is greater than a second threshold, the base station may schedule DL transmission to the first UE in the resource if the first UE supports interference cancellation. In some aspects, if the CLI measurement is less than the second threshold, the base station may schedule DL transmission to the first UE in the resource regardless of the first UE's ability to support interference cancellation.

Figure 13:
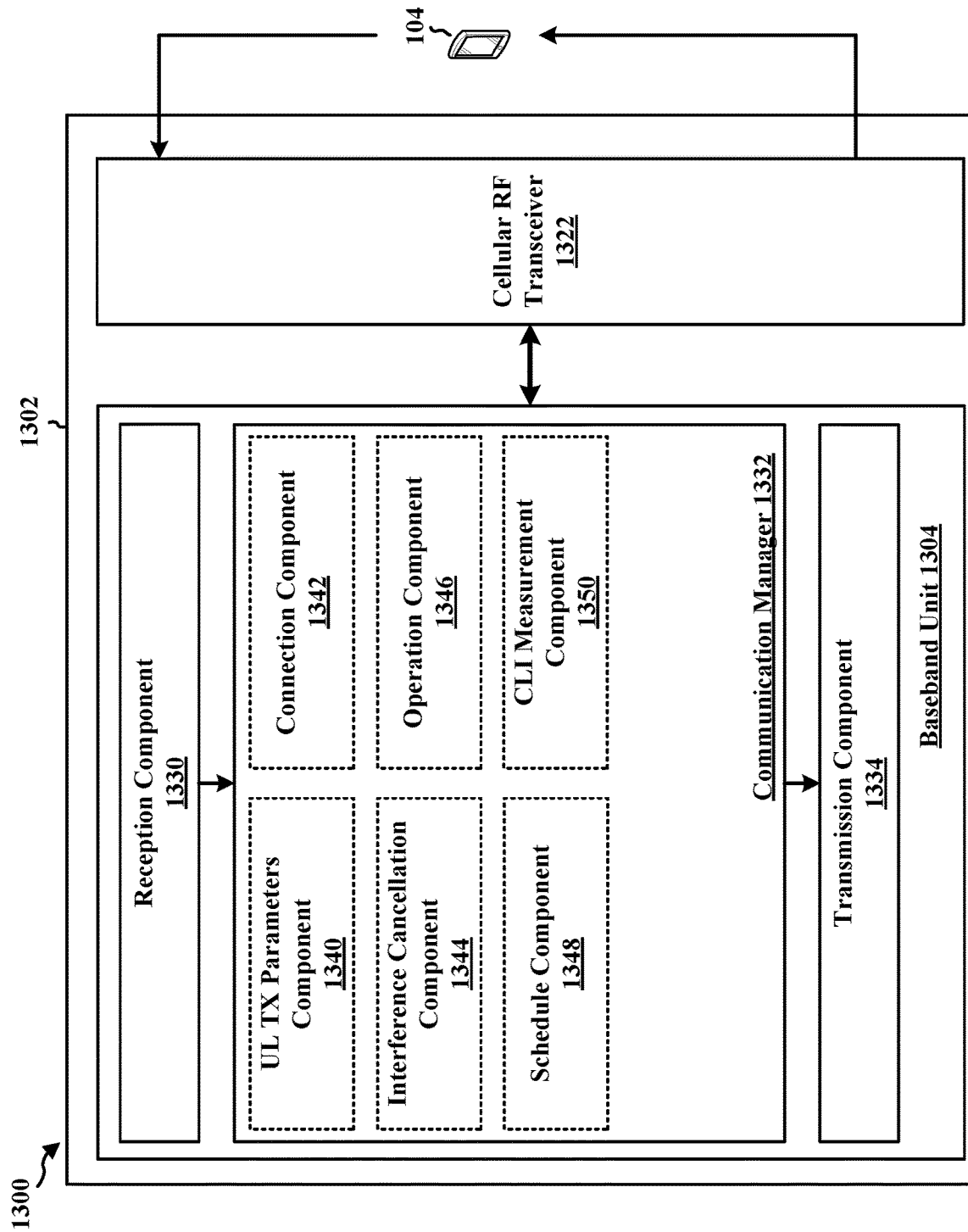
FIG. 13 is a diagram illustrating an example of a hardware implementation for an example apparatus.

FIG. 13 is a diagram 1300 illustrating an example of a hardware implementation for an apparatus 1302. In some aspects, the apparatus 1302 may be a base station, a component of a base station, or may implement base station functionality. The apparatus 1302 may be a base station (i.e., an aggregated base station), as a disaggregated base station, an IAB node, a relay node, a CU, a DU, a RU, a Near-RT RIC, or a Non-RT RIC in a disaggregated base station architecture, etc. In some aspects, the apparatus 1302 may be a UE or a component of a UE. In some aspects, the apparatus 1302 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 includes a UL TX parameters component 1340 that may obtain a set of uplink transmission parameters of a second UE in a second cell, e.g., as described in connection with 1102 of FIG. 11 or 1202 of FIG. 12. The UL TX parameters component 1340 may be further configured to transmit the set of uplink transmission parameters of the second UE to the first UE, e.g., as described in connection with 1104 of FIG. 11 or 1204 of FIG. 12. The UL TX parameters component 1340 may be further configured to receive the set of uplink transmission parameters from a neighbor base station serving the second UE, e.g., as described in connection with 1208 of FIG. 12. The communication manager 1332 further includes a connection component 1342 that may establish a connection with the first UE, e.g., as described in connection with 1206 of FIG. 12. The communication manager 1332 further includes an interference cancellation component 1344 that may receive an indication that the first UE supports the interference cancellation, e.g., as described in connection with 1210 of FIG. 12. The communication manager 1332 further includes an operation component 1346 that may receive information indicating a type of interference cancellation operation to be performed by the first UE, e.g., as described in connection with 1212 of FIG. 12. The communication manager 1332 further includes a schedule component 1348 that may schedule a downlink transmission for the first UE without adjustment for cross link interference measurements, e.g., as described in connection with 1214 of FIG. 12. The schedule component 1348 may be further configured to adjust downlink scheduling for the first UE based on the CLI measurement, e.g., as described in connection with 1218 of FIG. 12. The communication manager 1332 further includes a CLI measurement component 1350 that may receive a CLI measurement, e.g., as described in connection with 1216 of FIG. 12.

The apparatus may include additional components that perform each of the blocks of the algorithm in the flowcharts of FIGS. 11 and 12. As such, each block in the flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for obtaining a set of uplink transmission parameters of a second UE in a second cell. The apparatus includes means for transmitting the set of uplink transmission parameters of the second UE to the first UE. The apparatus further includes means for establishing a connection with the first UE. The set of uplink transmission parameters are transmitted in a unicast transmission. The apparatus further includes means for receiving the set of uplink transmission parameters from a neighbor base station serving the second UE. The apparatus further includes means for receiving an indication that the first UE supports the interference cancellation. A transmission of the set of uplink transmission parameters is provided to the first UE based on the first UE supporting the interference cancellation. The apparatus further includes means for receiving information indicating a type of interference cancellation operation to be performed by the first UE. The apparatus further includes means for scheduling a downlink transmission for the first UE without adjustment for cross link interference measurements in response to the indication indicating that the first UE supports the interference cancellation. The apparatus further includes means for receiving a cross-link interference measurement of the first UE based on the uplink transmission of the second UE. The apparatus further includes means for adjusting downlink scheduling for the first UE based on the cross-link interference measurement. The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a first UE comprising receiving a set of uplink transmission parameters of a second UE in a neighbor cell; and performing interference cancellation of an uplink transmission of the second UE on a downlink transmission received from a serving cell, the interference cancellation based at least on the set of uplink transmission parameters of the second UE.

Aspect 2 is the method of Aspect 1, further includes that the set of uplink transmission parameters of the second UE are received from the second UE via sidelink communication.

Aspect 3 is the method of any of Aspects 1 and 2, further includes that the set of uplink transmission parameters of the second UE are received from a base station associated with the serving cell.

Aspect 4 is the method of any of Aspects 1-3, further includes that the set of uplink transmission parameters are received via at least one of a MAC-CE, PHY signaling, or RRC signaling.

Aspect 5 is the method of any of Aspects 1-4, further includes that the set of uplink transmission parameters of the second UE correspond to the uplink transmission scheduled for the second UE in a downlink slot for the first UE.

Aspect 6 is the method of any of Aspects 1-5, further includes that the set of uplink transmission parameters comprises at least one of a frequency domain resource allocation or a time domain resource allocation of the uplink transmission of the second UE, a MCS of the uplink transmission of the second UE, a DMRS sequence initializer of the uplink transmission of the second UE, a scrambling sequence initializer of the uplink transmission of the second UE, a RNTI of the second UE, or a cell ID of the second UE.

Aspect 7 is the method of any of Aspects 1-6, further includes that the set of uplink transmission parameters are received in a sidelink broadcast transmission.

Aspect 8 is the method of any of Aspects 1-7, further includes that the set of uplink transmission parameters comprises coordination information indicating that the set of uplink transmission parameters are related to the interference cancellation.

Aspect 9 is the method of any of Aspects 1-8, further including establishing a connection with the second UE, wherein the set of uplink transmission parameters are received in a unicast transmission.

Aspect 10 is the method of any of Aspects 1-9, further includes that at least one uplink transmission parameter of the set of uplink transmission parameters are utilized to generate a scrambling sequence, wherein the at least one uplink transmission parameter is based on one or more of a configured value, a value that does not identify the second UE, or a cell ID.

Aspect 11 is the method of any of Aspects 1-10, further including providing, to a base station, an indication indicating support for the interference cancellation.

Aspect 12 is the method of any of Aspects 1-11, further including indicating, to the base station, a type of interference cancellation operation to be performed by the first UE.

Aspect 13 is the method of any of Aspects 1-12, further includes that the base station is associated with the neighbor cell, wherein scheduling of the uplink transmission of the second UE is adjusted to allow for processing of the uplink transmission by the first UE in response to the indication indicating that the first UE supports the interference cancellation.

Aspect 14 is the method of any of Aspects 1-13, further including transmitting, to a base station, a cross-link interference measurement based on the uplink transmission of the second UE.

Aspect 15 is an apparatus for wireless communication at a first UE including at least one processor coupled to a memory and at least one transceiver, the at least one processor configured to implement any of Aspects 1-14.

Aspect 16 is an apparatus for wireless communication at a first UE including means for implementing any of Aspects 1-14.

Aspect 17 is a computer-readable medium storing computer executable code, where the code when executed by a processor causes the processor to implement any of Aspects 1-14.

Aspect 18 is a method for wireless communication to a first UE in a first cell comprising obtaining a set of uplink transmission parameters of a second UE in a second cell; and transmitting the set of uplink transmission parameters of the second UE to the first UE.

Aspect 19 is the method of Aspect 18, further includes that the method is performed at the second UE, which transmits the set of uplink transmission parameters of the second UE to the first UE via sidelink communication.

Aspect 20 is the method of any of Aspects 18 and 19, further includes that the method is performed at a network entity serving the first UE, the method further including receiving the set of uplink transmission parameters from a neighbor base station serving the second UE.

Aspect 21 is the method of any of Aspects 18-20, further includes that the set of uplink transmission parameters are transmitted via at least one of a MAC-CE, PHY signaling, or RRC signaling.

Aspect 22 is the method of any of Aspects 18-21, further includes that the set of uplink transmission parameters of the second UE correspond to an uplink transmission scheduled for the second UE in a downlink slot for the first UE.

Aspect 23 is the method of any of Aspects 19-22, further includes that the set of uplink transmission parameters comprises at least one of a frequency domain resource allocation or a time domain resource allocation of the uplink transmission of the second UE, a MCS of the uplink transmission of the second UE, a DMRS sequence initializer of the uplink transmission of the second UE, a scrambling sequence initializer of the uplink transmission of the second UE, a RNTI of the second UE, or a cell ID of the second UE.

Aspect 24 is the method of any of Aspects 19-23, further includes that the set of uplink transmission parameters are transmitted in a broadcast transmission.

Aspect 25 is the method of any of Aspects 19-24, further includes that the set of uplink transmission parameters comprises coordination information indicating that the set of uplink transmission parameters are related to the interference cancellation.

Aspect 26 is the method of any of Aspects 19-25, further includes that to transmit the set of uplink transmission parameters, the method further including establishing a connection with the first UE, wherein the set of uplink transmission parameters are transmitted in a unicast transmission.

Aspect 27 is the method of any of Aspects 19-26, further includes that an uplink transmission of the second UE includes a scrambling sequence based on one or more of a common value, a value that does not identify the second UE, or a cell ID.

Aspect 28 is the method of any of Aspects 19-27, further including receiving an indication that the first UE supports the interference cancellation, wherein a transmission of the set of uplink transmission parameters is provided to the first UE based on the first UE supporting the interference cancellation.

Aspect 29 is the method of any of Aspects 19-28, further including receiving information indicating a type of interference cancellation operation to be performed by the first UE.

Aspect 30 is the method of any of Aspects 19-29, further including scheduling a downlink transmission for the first UE without adjustment for cross link interference measurements in response to the indication indicating that the first UE supports the interference cancellation.

Aspect 31 is the method of any of Aspects 19-30, further including receiving a cross-link interference measurement of the first UE based on the uplink transmission of the second UE.

Aspect 32 is the method of any of Aspects 19-31, further including adjusting downlink scheduling for the first UE based on the cross-link interference measurement.

Aspect 33 is an apparatus for wireless communication to a first UE including at least one processor coupled to a memory and at least one transceiver, the at least one processor configured to implement any of Aspects 19-32.

Aspect 34 is an apparatus for wireless communication to a first UE including means for implementing any of Aspects 19-32.

Aspect 35 is a computer-readable medium storing computer executable code, where the code when executed by a processor causes the processor to implement any of Aspects 19-32.

What is claimed is:

1. An apparatus for wireless communication at a first user equipment (UE), comprising:
   memory;
   at least one transceiver; and
   at least one processor, communicatively connected to the memory and the at least one transceiver, the at least one processor configured to:
   receive, from a second UE, in a sidelink transmission between the first UE and the second UE, a set of uplink transmission parameters of the second UE in a neighbor cell; and
   perform interference cancellation of an uplink transmission of the second UE on a downlink transmission received from a serving cell, the interference cancellation based at least on the set of uplink transmission parameters of the second UE received in the sidelink transmission, wherein the set of uplink transmission parameters of the second UE corresponds to the uplink transmission scheduled for the second UE in a downlink slot for the first UE.

2. The apparatus of claim 1, wherein the set of uplink transmission parameters are received via at least one of a medium access control (MAC) control element (CE) (MAC-CE), physical layer (PHY) signaling, or radio resource control (RRC) signaling.

3. The apparatus of claim 1, wherein the set of uplink transmission parameters comprises at least one of:
   a modulation and coding scheme (MCS) of the uplink transmission of the second UE,
   a demodulated reference signal (DMRS) sequence initializer of the uplink transmission of the second UE,
   a scrambling sequence initializer of the uplink transmission of the second UE,
   a radio network temporary identifier (RNTI) of the second UE, or
   a cell identifier (ID) of the second UE.

4. The apparatus of claim 1, wherein the set of uplink transmission parameters are received in a sidelink broadcast transmission.

5. The apparatus of claim 1, wherein the set of uplink transmission parameters comprises coordination information indicating that the set of uplink transmission parameters are related to the interference cancellation.

6. The apparatus of claim 1, wherein to receive the set of uplink transmission parameters the at least one processor is further configured to:
establish a connection with the second UE, wherein the set of uplink transmission parameters are received in a unicast transmission.

7. The apparatus of claim 1, wherein at least one uplink transmission parameter of the set of uplink transmission parameters are utilized to generate a scrambling sequence, wherein the at least one uplink transmission parameter is based on one or more of:
a configured value,
a value that does not identify the second UE, or
a cell identifier (ID).

8. The apparatus of claim 1, wherein the at least one processor is further configured to:
provide, to a base station, an indication indicating support for the interference cancellation.

9. The apparatus of claim 8, wherein the at least one processor is further configured to:
indicate, to the base station, a type of interference cancellation operation to be performed by the first UE.

10. The apparatus of claim 8, wherein the base station is associated with the neighbor cell, wherein scheduling of the uplink transmission of the second UE is adjusted to allow for processing of the uplink transmission by the first UE in response to the indication indicating that the first UE supports the interference cancellation.

11. The apparatus of claim 1, wherein the at least one processor is further configured to:
transmit, to a base station, a cross-link interference measurement based on the uplink transmission of the second UE.

12. An apparatus for wireless communication to a first user equipment (UE) in a first cell, comprising:
memory;
at least one transceiver; and
at least one processor, communicatively connected to the memory and the at least one transceiver, the at least one processor configured to:
obtain, from a base station associated with a second cell, a set of uplink transmission parameters of a second UE in the second cell, wherein the first cell is different from the second cell; and
transmit the set of uplink transmission parameters of the second UE to the first UE in the first cell, wherein the set of uplink transmission parameters of the second UE corresponds to an uplink transmission scheduled for the second UE in a downlink slot for the first UE.

13. A method of wireless communication at a first user equipment (UE), comprising:
receiving, from a second UE, in a sidelink transmission between the first UE and the second UE, a set of uplink transmission parameters of the second UE in a neighbor cell; and
performing interference cancellation of an uplink transmission of the second UE on a downlink transmission received from a serving cell, the interference cancellation based at least on the set of uplink transmission parameters of the second UE received in the sidelink transmission, wherein the set of uplink transmission parameters of the second UE corresponds to the uplink transmission scheduled for the second UE in a downlink slot for the first UE.

14. The method of claim 13, wherein the set of uplink transmission parameters are received via at least one of a medium access control (MAC) control element (CE) (MAC-CE), physical layer (PHY) signaling, or radio resource control (RRC) signaling.

15. The method of claim 13, wherein the set of uplink transmission parameters comprises at least one of:
a modulation and coding scheme (MCS) of the uplink transmission of the second UE,
a demodulated reference signal (DMRS) sequence initializer of the uplink transmission of the second UE,
a scrambling sequence initializer of the uplink transmission of the second UE,
a radio network temporary identifier (RNTI) of the second UE, or
a cell identifier (ID) of the second UE.

16. The method of claim 13, wherein the set of uplink transmission parameters are received in a sidelink broadcast transmission.

17. The method of claim 13, wherein the set of uplink transmission parameters comprises coordination information indicating that the set of uplink transmission parameters are related to the interference cancellation.

18. The method of claim 13, wherein to receive the set of uplink transmission parameters, the method further comprising:
establishing a connection with the second UE, wherein the set of uplink transmission parameters are received in a unicast transmission.

19. The method of claim 13, wherein at least one uplink transmission parameter of the set of uplink transmission parameters are utilized to generate a scrambling sequence, wherein the at least one uplink transmission parameter is based on one or more of:
a configured value,
a value that does not identify the second UE, or
a cell identifier (ID).

20. The method of claim 13, further comprising:
providing, to a base station, an indication indicating support for the interference cancellation.

21. The method of claim 20, further comprising:
indicating, to the base station, a type of interference cancellation operation to be performed by the first UE.

22. The method of claim 20, wherein the base station is associated with the neighbor cell, wherein scheduling of the uplink transmission of the second UE is adjusted to allow for processing of the uplink transmission by the first UE in response to the indication indicating that the first UE supports the interference cancellation.

23. The method of claim 13, further comprising:
transmitting, to a base station, a cross-link interference measurement based on the uplink transmission of the second UE.

24. A method of wireless communication to a first user equipment (UE) in a first cell comprising:
obtaining, from a base station associated with a second cell, a set of uplink transmission parameters of a second UE in the second cell, wherein the first cell is different from the second cell; and
transmitting the set of uplink transmission parameters of the second UE to the first UE in the first cell, wherein the set of uplink transmission parameters of the second UE corresponds to the uplink transmission scheduled for the second UE in a downlink slot for the first UE.

* * * * *